United States Patent
Tanimoto et al.

(10) Patent No.: US 8,144,375 B2
(45) Date of Patent: Mar. 27, 2012

(54) IMAGE FORMING APPARATUS

(75) Inventors: Koji Tanimoto, Tagata-gun (JP); Jun Sakakibara, Tokyo (JP); Kunihiko Miura, Hiratsuka (JP); Naoya Murakami, Yokohama (JP); Akihiro Moro, Sunto-gun (JP); Sunao Tabata, Mishima (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/762,695

(22) Filed: Apr. 19, 2010

(65) Prior Publication Data
US 2010/0202004 A1 Aug. 12, 2010

Related U.S. Application Data

(63) Continuation of application No. 11/218,328, filed on Sep. 2, 2005, now Pat. No. 7,864,386, which is a continuation of application No. PCT/JP2004/002080, filed on Feb. 23, 2004.

(30) Foreign Application Priority Data

Mar. 4, 2003 (JP) ................................ 2003-057267

(51) Int. Cl.
*H04N 1/04* (2006.01)
(52) U.S. Cl. ......... 358/474; 358/496; 358/497; 358/448
(58) Field of Classification Search .................. 358/496, 358/497, 448, 474, 505, 515
See application file for complete search history.

(56) References Cited

U.S. PATENT DOCUMENTS

| | | | |
|---|---|---|---|
| 5,778,276 A | 7/1998 | Hasegawa | |
| 5,796,928 A | 8/1998 | Toyomura et al. | |
| 5,894,356 A | 4/1999 | Yoo | |
| 6,594,039 B1 | 7/2003 | Kanbayashi | |
| 6,765,703 B1 | 7/2004 | Watanabe | |
| 7,268,914 B2 | 9/2007 | Noguchi et al. | |
| 7,403,308 B2 * | 7/2008 | Moro | 358/2.1 |
| 2002/0093694 A1 | 7/2002 | Spears | |
| 2003/0007816 A1 * | 1/2003 | Ishimaru et al. | 399/367 |
| 2003/0053157 A1 | 3/2003 | Sakakibara et al. | |

FOREIGN PATENT DOCUMENTS

| | | |
|---|---|---|
| EP | 0 551 823 A2 | 7/1993 |
| JP | 1-213071 A | 8/1989 |
| JP | 04-172058 A | 6/1992 |

(Continued)

OTHER PUBLICATIONS

K. Tanimoto, U.S. PTO Final Office Action, U.S. Appl. No. 11/218,328, dated Jan. 19, 2010.

(Continued)

*Primary Examiner* — Houshang Safaipour
(74) *Attorney, Agent, or Firm* — Foley & Lardner LLP

(57) ABSTRACT

When a monochromatic copy mode is to be executed, a control section sets a read mode in a scanner section so as to enable the scanner section to read an image at high speed by means of only a line sensor K, sets in an image processing section an image process that can print monochromatic image information, which is sent from the scanner section, with a single black color in the printer section, and sets in the printer section a monochromatic print mode that can print a black image at high speed, thereby controlling a monochromatic copy operation.

6 Claims, 23 Drawing Sheets

FOREIGN PATENT DOCUMENTS

| | | | |
|---|---|---|---|
| JP | 5-276318 A | | 10/1993 |
| JP | 6-113073 A | | 4/1994 |
| JP | 06-284255 A | | 10/1994 |
| JP | 8-279884 A | | 10/1996 |
| JP | 10-051602 A | | 2/1998 |
| JP | 10-83104 A | | 3/1998 |
| JP | 10-136151 A | | 5/1998 |
| JP | 10-155076 A | | 6/1998 |
| JP | 10-307443 A | | 11/1998 |
| JP | 11-027452 A | | 1/1999 |
| JP | 11-220569 | * | 8/1999 |
| JP | 11-220569 A | | 8/1999 |
| JP | 11-261760 A | | 9/1999 |
| JP | 2000-069254 A | | 3/2000 |
| JP | 2000-307821 A | | 11/2000 |
| JP | 2001-034082 A | | 2/2001 |
| JP | 2001-061104 A | | 3/2001 |
| JP | 2001-245164 A | | 9/2001 |
| JP | 2001-296719 A | | 10/2001 |
| JP | 2001-298590 A | | 10/2001 |
| JP | 2001-326794 A | | 11/2001 |
| JP | 2001-326798 A | | 11/2001 |
| JP | 2002-111968 A | | 4/2002 |
| JP | 2002-209057 A | | 7/2002 |
| JP | 2002-247290 A | | 8/2002 |
| JP | 2002-314763 A | | 10/2002 |
| JP | 2002-354273 A | | 12/2002 |
| JP | 2003-022439 A | | 1/2003 |

OTHER PUBLICATIONS

K. Tanimoto, U.S. PTO Office Action, U.S. Appl. No. 11/218,328, dated Jul. 22, 2009.

K. Tanimoto, U.S. PTO Final Office Action, U.S. Appl. No. 11/218,328, dated Feb. 5, 2009.

K. Tanimoto, U.S. PTO Office Action, U.S. Appl. No. 11/218,328, dated Aug. 18, 2008.

K. Tanimoto, U.S. PTO Notice of Allowance, U.S. Appl. No. 11/218,328, dated Jun. 7, 2010, 8 pages.

K. Tanimoto, U.S. PTO Office Action, U.S. Appl. No. 13/296,758, dated Jan. 30, 2012, 11 pages.

* cited by examiner

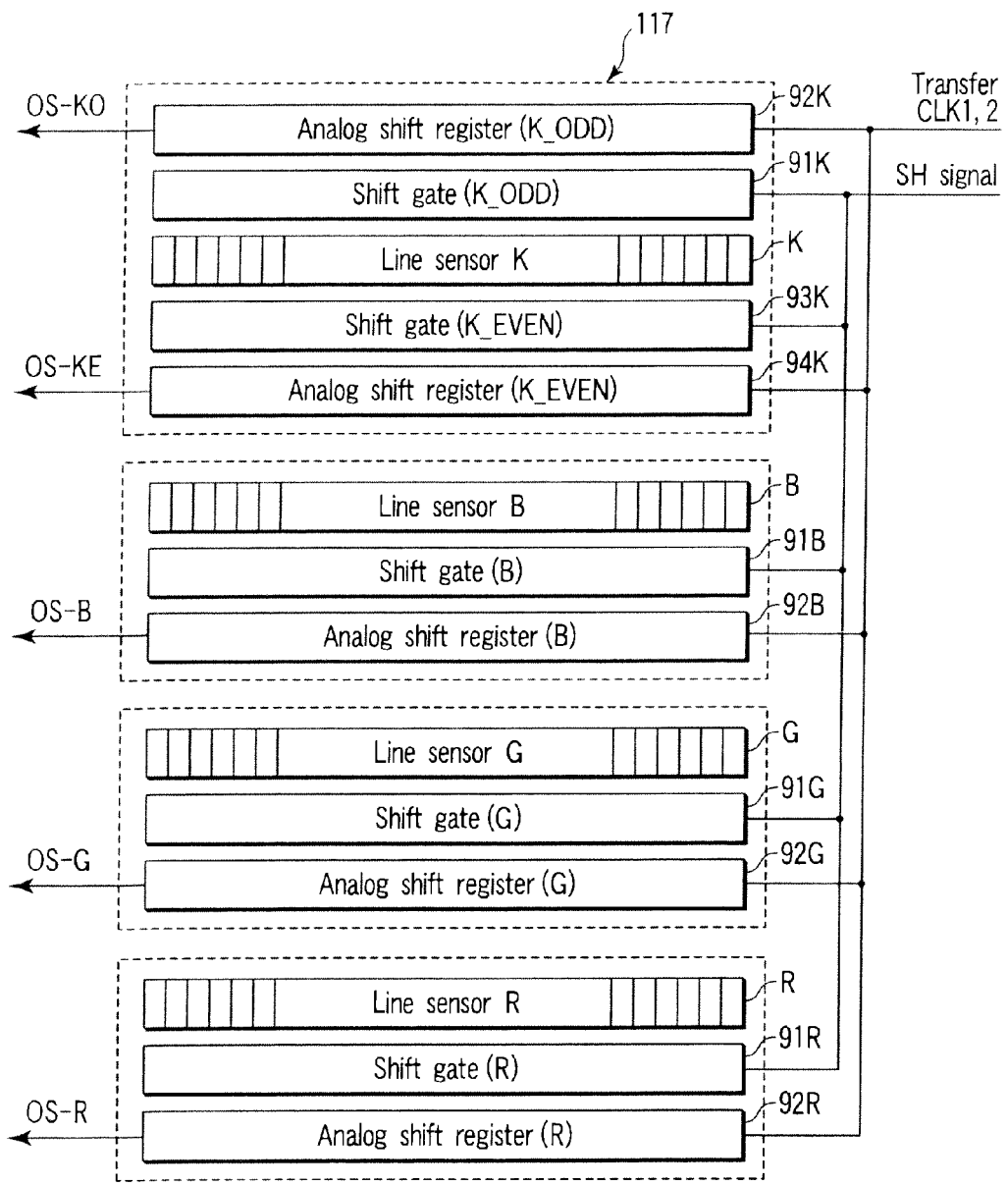
F I G. 8

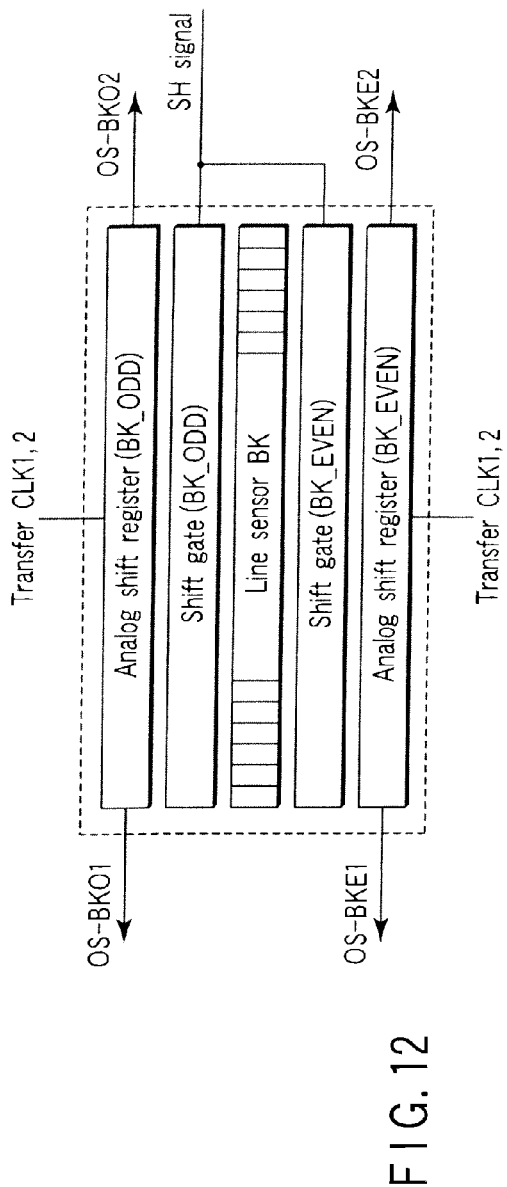
F I G. 12
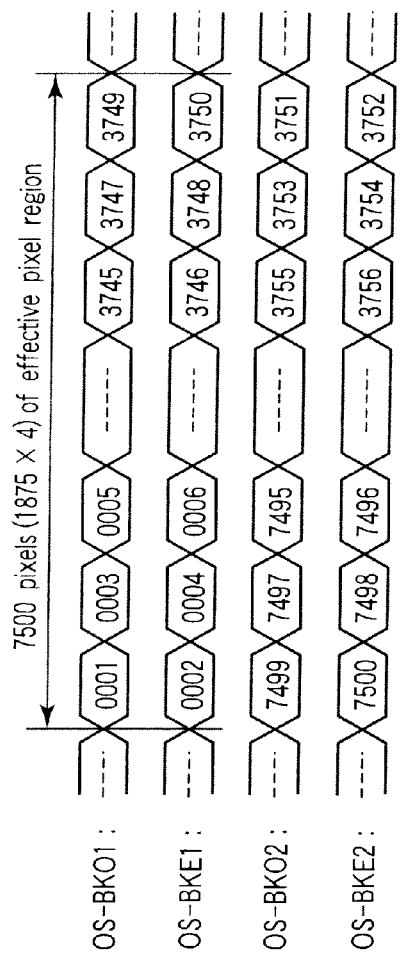
F I G. 13

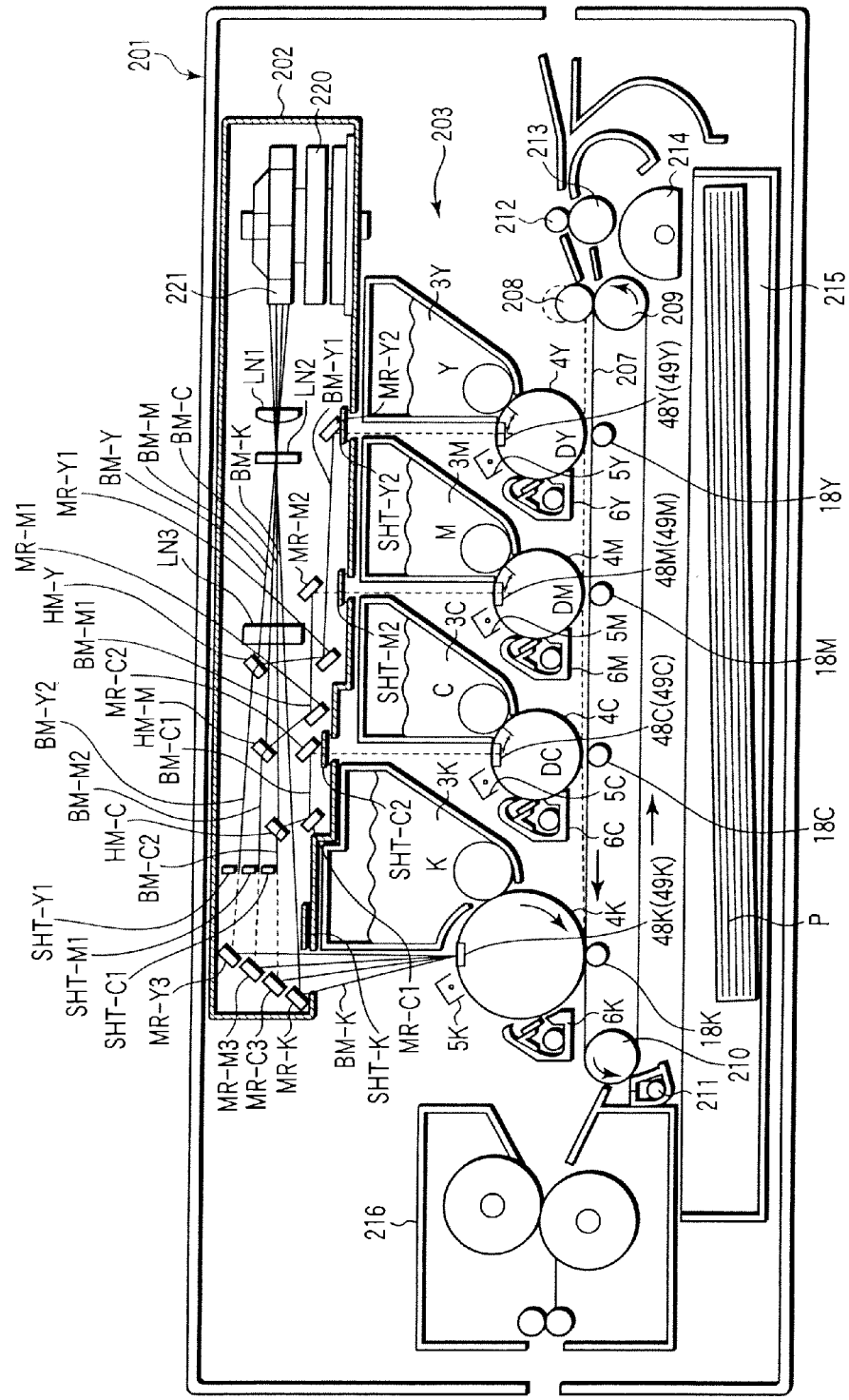
F I G. 16

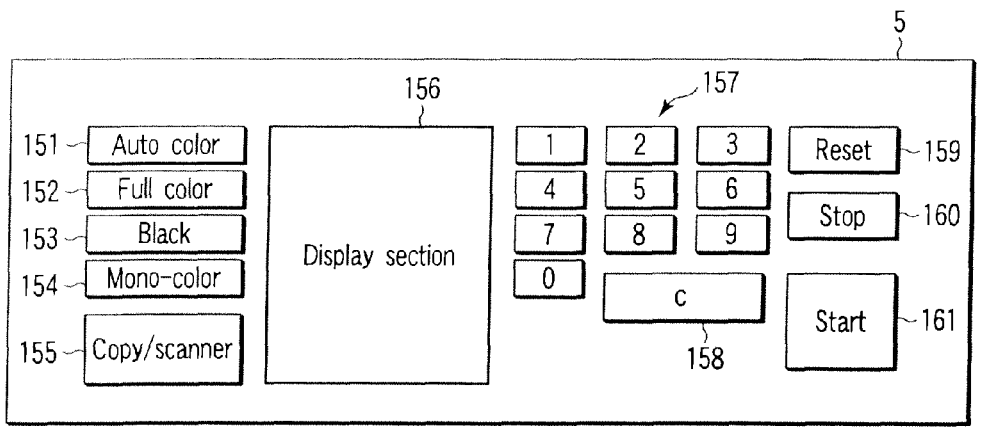
F I G. 18
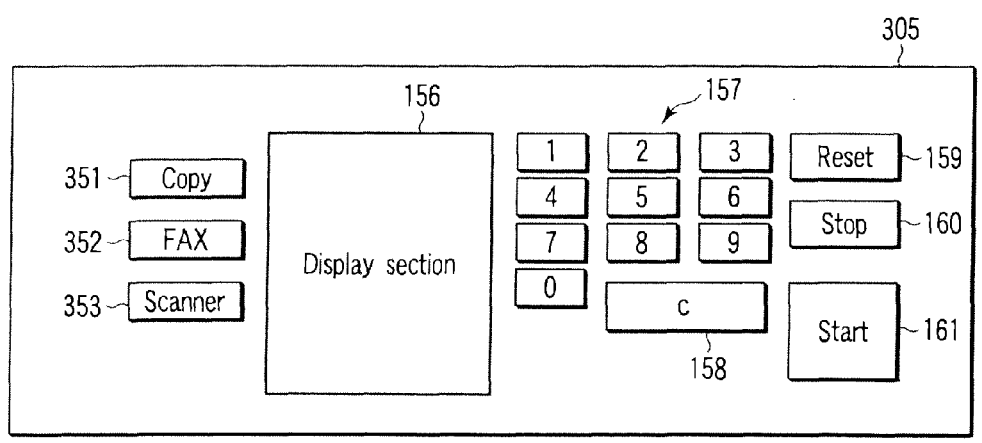
F I G. 19

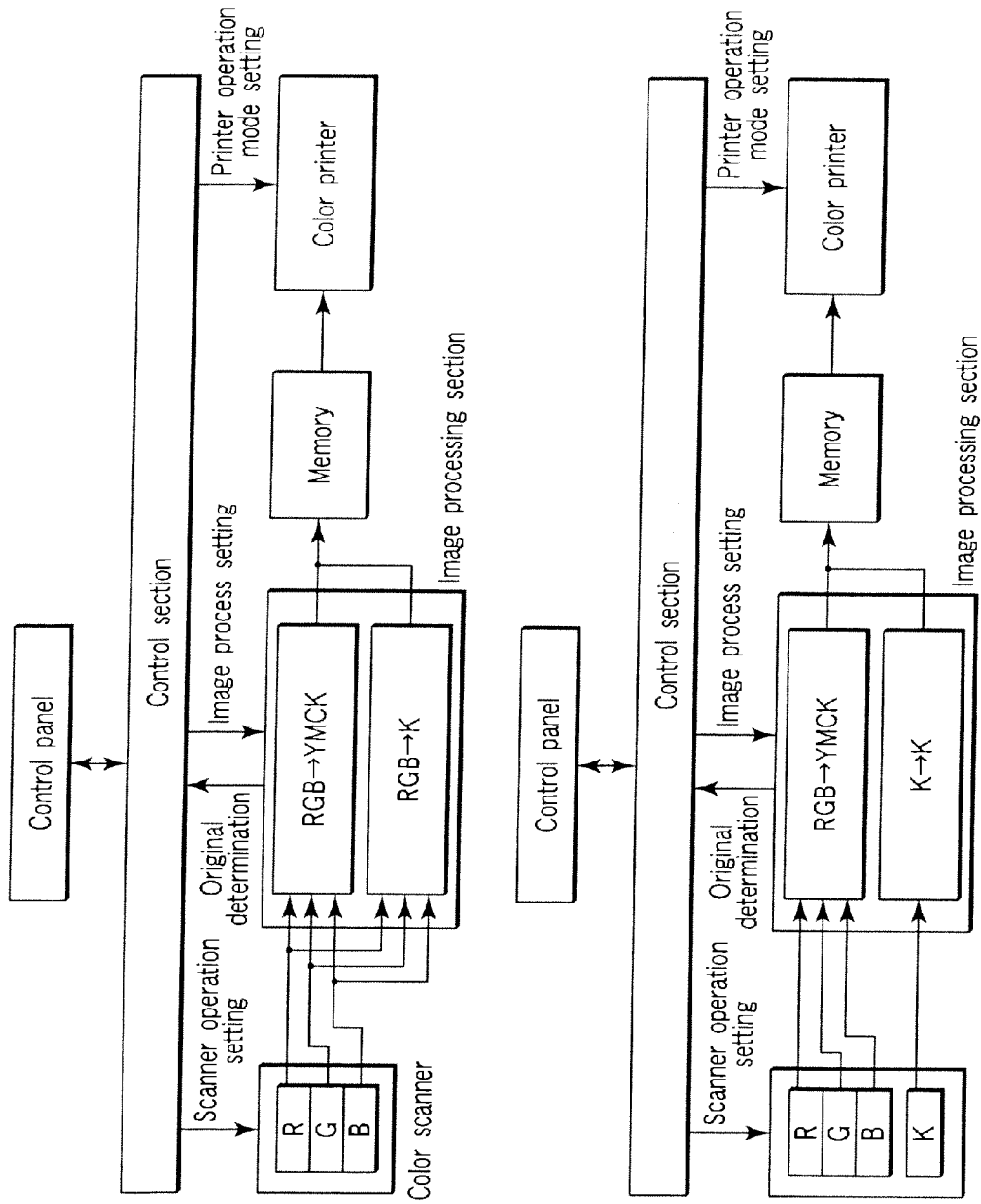
F I G. 20
F I G. 21

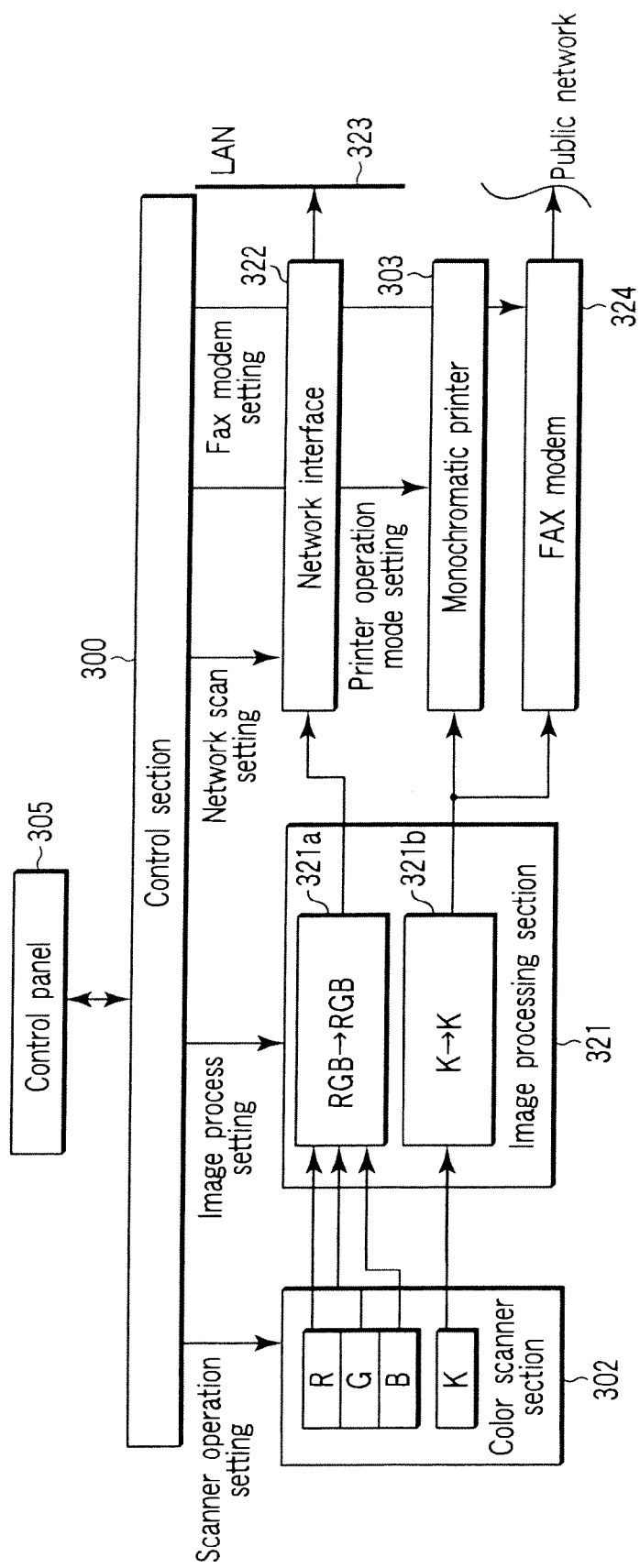
F I G. 27

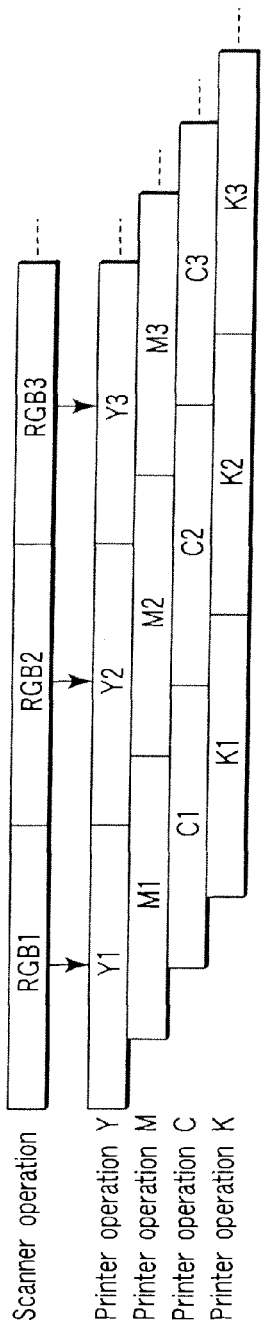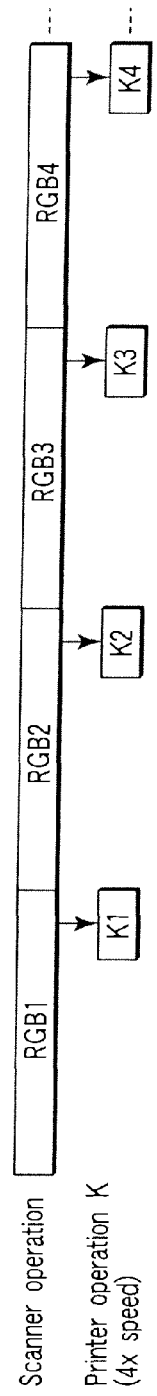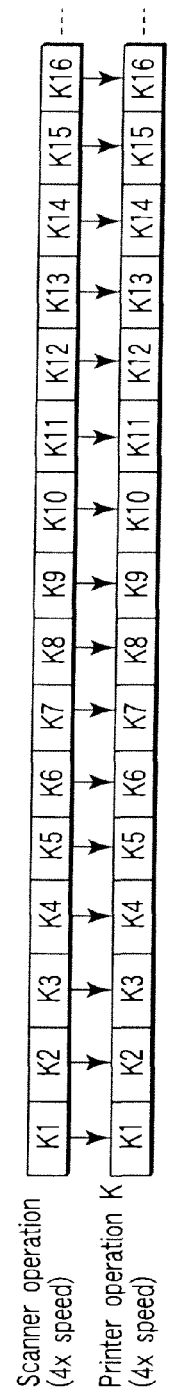

F I G. 34
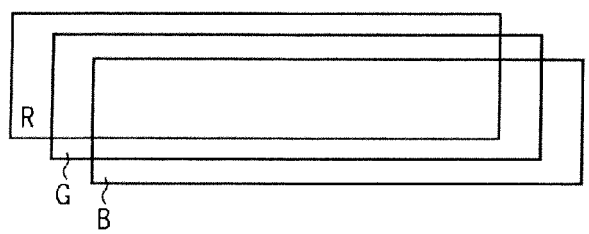
F I G. 35
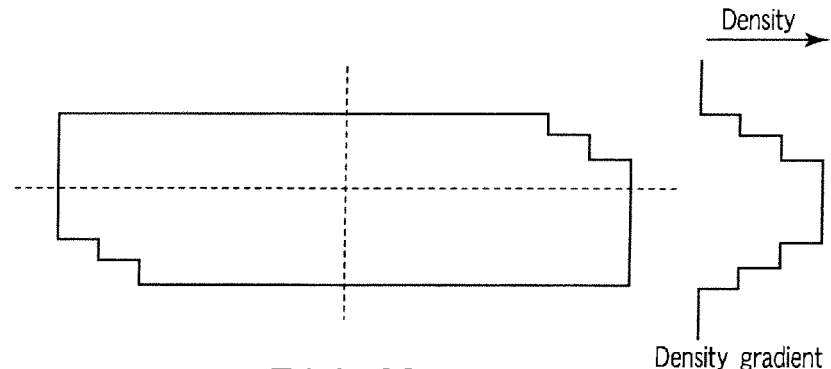
F I G. 36
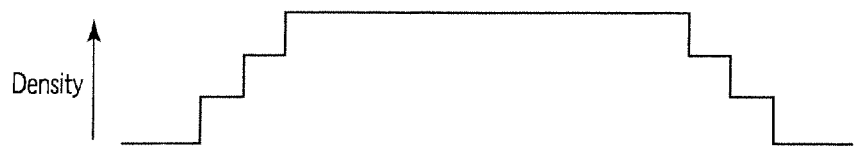
F I G. 37

IMAGE FORMING APPARATUS

CROSS-REFERENCE TO RELATED APPLICATIONS

This is a Continuation of U.S. application Ser. No. 11/218,328, filed Sep. 2, 2005, which is a Continuation Application of PCT Application No. PCT/JP2004/002080, filed Feb. 23, 2004, which was published under PCT Article 21(2) in Japanese and is based upon and claims the benefit of priority from prior Japanese Patent Application No. 2003-057267, filed Mar. 4, 2003, the entire contents of which are incorporated herein by reference.

BACKGROUND OF THE INVENTION

1. Field of the Invention

The present invention relates generally to image forming apparatus, and more particularly to a color MFP (Multi-Function Peripheral) and a monochromatic MFP (Multi-Function Peripheral) having a color scan function.

2. Description of the Related Art

In recent years, an apparatus called a multi-function peripheral (MFP), in which functions of a copier, a facsimile and a printer are integrated, has widely been used.

A color MFP has a function of executing scan, copy and print in color.

In a conventional color MFP, in general, when a monochromatic (achromatic) original is to be copied, the original is read by a color scanner and the read image information on the original is sent to a printer section, thereby forming an image. In addition, in a case where the color MFP is provided with a monochromatic copy mode or a single-color copy mode, monochromatic image information (luminance information) is, in general, extracted from color image information that is read by the color scanner, and the printer is operated in the monochromatic print mode or single-color print mode, thereby obtaining a monochromatic image or a single-color image.

The color MFP is generally constructed to include a scanner section, in which a color sensor is incorporated, and a 4-rotation-type color printer (to be described later).

A monochromatic MFP with a color scan function has such a function that copy and print are executed in a monochromatic mode and scan is executed in a color mode.

Like the color MFP, in the monochromatic MFP with the color scan function, when a monochromatic original is to be copied, the original is, in general, read by a color scanner and monochromatic image information (luminance information) is extracted from the read color image information, and the printer is operated in the monochromatic print mode, thereby obtaining a monochromatic image.

The monochromatic MFP with the color scan function is generally constructed to include a scanner section, in which a color sensor is incorporated, and a monochromatic printer.

In addition, a CCD sensor that is used in the MFP, that is, a CCD sensor functioning as a color sensor that is incorporated in the scanner for reading a color image, is generally composed of three lines of, e.g. R, G and B (R: red, G: green, and B: blue), which have sensitivities for only specific light wavelengths).

However, in the case where an original that is read by color scanning is copied as a monochromatic document by a conventional method, such problems as a decrease in image quality and deficiency in image output speed have been pointed out.

In the case where monochromatic image information is to be obtained by the above-described sensor, the monochromatic image information is compounded from R, G and B color information, which is separately read. Thus, if lens characteristics have chromatic aberration or if non-uniformity in speed (jitter) occurs in the driving system at a time of reading, misregistration would occur in images that are captured by the R, G and B sensors. Consequently, an edge portion, in particular, of an image, which should normally be a monochromatic (achromatic) image, may be captured as a color image, or an image with color misregistration (chromatic aberration), which is larger than a real image, may be captured. A monochromatic image, which is obtained on the basis of such information, becomes different from a normal image, and the image quality deteriorates.

FIGS. 34, 35, 36 and 37 explain this phenomenon. For example, if chromatic aberration or driving jitter occurs when a rectangular original image (achromatic) with no density gradient is read by three RGB line sensors, images that are read by the RGB line sensors are misregistered in a main scan direction and a sub-scan direction. If such image information is output from a printer section, the shape of the output image is distorted, as shown in the Figures. Consequently, density gradient occurs at the edge portions. Thus, the quality of the image that is output from the printer deteriorates (problem of image quality).

In addition, the three RGB line sensors that are built in the scanner section are normally provided with color filters for passing only light of specific wavelength bands. The sensitivity of these line sensors is lower than that of a sensor with no such filter. As a result, compared to an apparatus that is dedicated to a monochromatic mode, there is a problem that the speed of monochromatic copy is low. If the speed is to be increased, it is necessary to increase the size of the sensors, thereby enhancing the sensitivity, or to provide a large light source. This leads to an increase in size of the apparatus (problem of reading speed, and problem of increase in size of the scanner section).

Furthermore, in the case where the print output speed of the color printer section differs between the color mode and monochromatic mode, an unmatched relation in speed occurs between the scanner section and the printer section. Consequently, the performance of the printer section cannot fully be exhibited. Besides, this leads to such problems that the lifetime of the printer section decreases, and the lifetime of consumable components of the printer section, such as a photoconductor drum, becomes shorter than the normal lifetime (problems of apparatus lifetime and consumable component lifetime).

BRIEF SUMMARY OF THE INVENTION

The object of the present invention is to provide an image forming apparatus that can increase the speed of monochromatic copy (single-color copy) in a color MFP and a monochromatic MFP having a color scan function.

In order to achieve this object, according to a first aspect of the invention, there is provided an image forming apparatus comprising: first image reading means for reading an image at a first scan speed, and converting the image to image information; second image reading means for reading an image at a second scan speed, which is higher than the first scan speed, and converting the image to image information; first output image forming means for forming an output image on the basis of the image information that is read by the first image reading means; and second output image forming means for forming an output image on the basis of the image informa-

BRIEF DESCRIPTION OF THE SEVERAL VIEWS OF THE DRAWING

FIG. 8 schematically shows the structure of a 4-line CCD sensor;

FIG. 12 is a view for explaining the signal output of the line sensor K;

FIG. 13 is a view for explaining the signal output of the line sensor K;

FIG. 16 shows the internal structure of the image forming apparatus according to the second embodiment of the present invention;

FIG. 18 shows a control panel of a color MFP;

FIG. 19 shows a control panel of a monochromatic MFP;

FIG. 20 is a block diagram showing a system configuration of a conventional color MFP;

FIG. 21 is a block diagram showing a system configuration of a color MFP according to the present invention;

FIG. 27 is a block diagram showing a system, according to the invention, of a monochromatic MFP that is capable of executing color scan;

FIG. 31 is a timing chart that illustrates the operations of the scanner section and printer section;

FIG. 32 is a timing chart that illustrates the operations of the scanner section and printer section;

FIG. 33 is a timing chart that illustrates the operations of the scanner section and printer section;

FIG. 34 is a view for explaining the phenomenon of a decrease in image quality;

FIG. 35 is a view for explaining the phenomenon of a decrease in image quality;

FIG. 36 is a view for explaining the phenomenon of a decrease in image quality; and FIG. 37 is a view for explaining the phenomenon of a decrease in image quality.

DETAILED DESCRIPTION OF THE INVENTION

Embodiments of the present invention will now be described with reference to the accompanying drawings.

Figure 1:
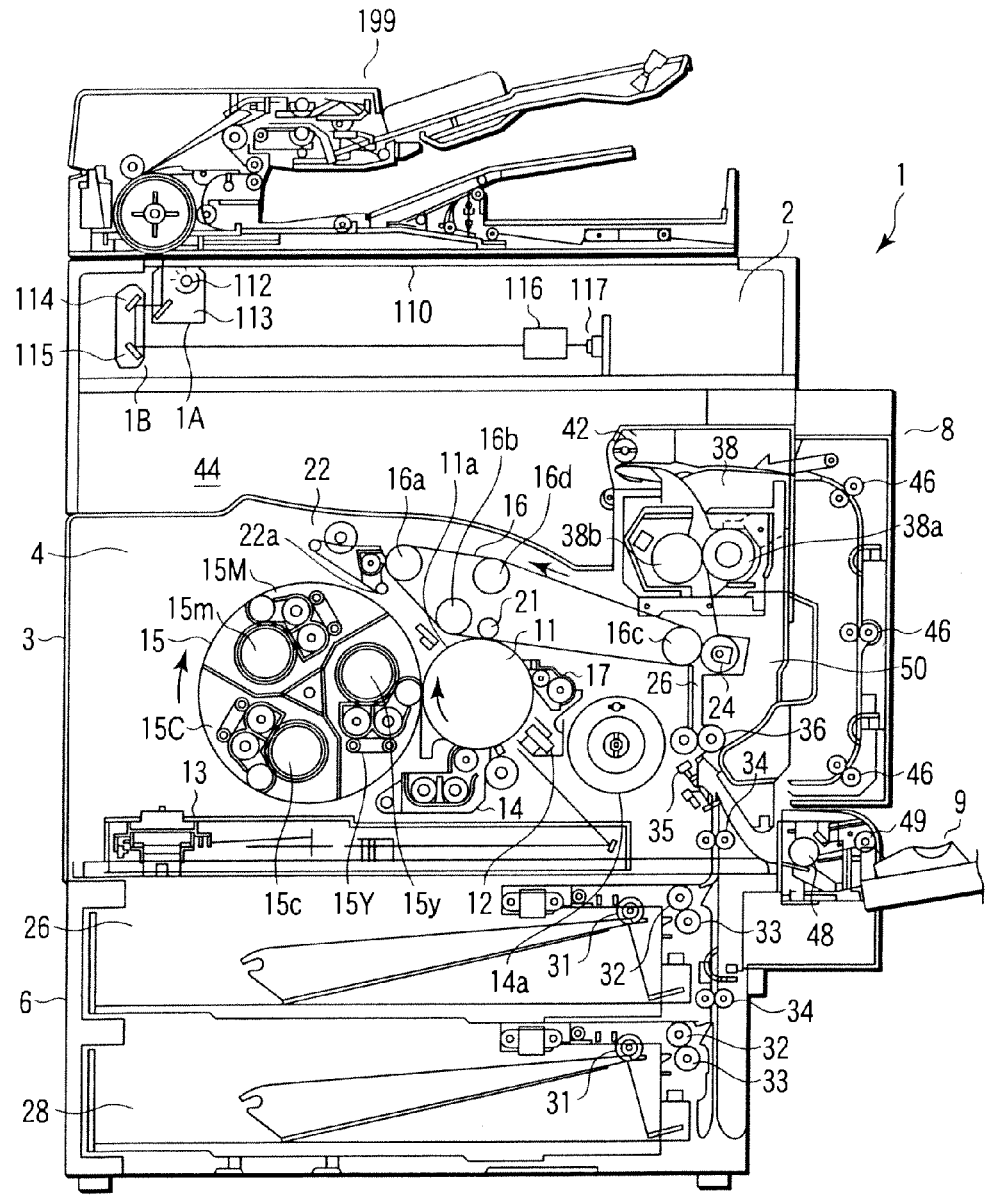
FIG. 1 shows an internal structure of an image forming apparatus according to a first embodiment of the present invention.

FIG. 1 shows an internal structure of an image forming apparatus according to a first embodiment of the present invention.

The image forming apparatus shown in FIG. 1 is described as an image forming apparatus 1 of the first embodiment, as will be explained later in detail.

The image forming apparatus comprises an automatic document feeder (ADF) 199, a scanner section 2 that functions as an image reading section, a process unit 4 that forms an output image, a sheet feed unit 6, and a control panel ("con-pane") that is not shown in FIG. 1.

In the scanner section 2, an original that is fed from the ADF or set on an original table is illuminated with light from a light source. Reflective light from the original is guided to a sensor (light receiving element) via optical members such as a mirror and a lens, and subjected to photoelectric conversion. The resultant image data is output to the process unit 4, or an external device or a network (not shown).

The scanner section 2 includes an original table 110, a first carriage 1A having a light source 112 and a mirror 113, a second carriage 1B having a mirror 114 and a mirror 115, a lens 116, and a 4-CCD line sensor 117 that is to be described later.

A printer section 3 comprises the above-mentioned process unit 4, sheet feed unit 6, a double-side unit 8, and a manual feed unit 9.

Next, the structure of the process unit 4 is described.

The process unit 4 includes a photoconductor drum 11 (image-carrying body) that extends in a front-rear direction (i.e. a direction vertical to the surface of the drawing sheet). Around the photoconductor drum 11, a charger 12, an exposing device 13, a black developing device 14 (second developing device), a revolver 15 (developing unit), an intermediate transfer belt 16 (intermediate transfer member) and a drum cleaner 17 (cleaning device) are provided in the rotational direction (indicated by the arrow in the Figure) of the photoconductor drum 11.

The charger 12 charges an outer peripheral surface 11a of the photo conductor drum 11 (hereinafter referred to as "drum surface 11a") with a predetermined potential. The exposing device 13 is provided near a lower end portion of the process unit 4. The exposing device 13 exposes the drum surface 11a, which is charged with the predetermined potential, with a scanning laser beam, thereby forming electrostatic latent images of respective colors on the drum surface 11a.

The black developing device 14 is disposed between the photoconductor drum 11 and the exposing device 13, that is, at a position below the photoconductor drum 11 where the black developing device 14 faces the photoconductor drum 11. The black developing device 14 develops the electrostatic latent image for black, which is formed on the drum surface 11*a* by the exposing device 13, thereby forming a black developer image on the drum surface 11*a*. The black developing device 14 is disposed to be movable so as to move a developing roller into contact with, and out of contact with, the drum surface 11*a*. When a black image is to be formed, the developing roller moves to come in contact with the drum surface 11*a*. When an image of another color is to be formed, the developing roller moves away from the drum surface 11*a*. The black developing device 14 is supplied with a developer from a toner cartridge 14*a*.

The revolver 15 is rotatably provided on the left side (in the Figure) of the photoconductor drum 11. The revolver 15 includes a yellow developing device 15Y (first developing device), a magenta developing device 15M (second developing device), and a cyan developing device 15C (third developing device). The respective developing devices are arranged in the rotational direction of the revolver 15, and are detachably accommodated within the revolver 15. The respective developing devices have toner cartridges 15*y*, 15*m* and 15*c* that contain developers of the associated colors.

When an image is to be formed, the revolver 15 is rotated clockwise and a desired developing device is selectively caused to face the photoconductor drum surface 11*a*.

As has been described above, of the developing devices that are built in the process unit 4, only the black developing device 14 is independently disposed, and the other three yellow developing device 15Y, magenta developing device 15M and cyan developing device 15C are disposed as a group within the revolver 15.

As is clear from this structure, when yellow, magenta and cyan images are to be formed, an operation such as rotation of the revolver 15 is required. On the other hand, when a black image is to be formed, it should suffice if the black developing device 14 is approached to the drum surface 11*a*. Thus, the time that is needed to enable image formation is shorter for black than for the other colors.

The intermediate transfer belt 16 is disposed at a position above the photoconductor drum 11 where the intermediate transfer belt 16 contacts the photoconductor drum 11. The intermediate transfer belt 16 is passed over a driving roller 16*a*, a pre-transfer roller 16*b*, a transfer opposed roller 16*c* and a tension roller 16*d*, which have rotational axes extending in the front-rear direction (direction vertical to the surface of the drawing sheet).

A primary transfer roller 21 is provided inside the intermediate transfer belt 16. The primary transfer roller 21 presses the intermediate transfer belt 16 on the drum surface 11*a* under a predetermined pressure and transfers the developer image, which is formed on the drum surface 11*a*, to the intermediate transfer belt.

A belt cleaner 22 for cleaning the belt and a secondary transfer roller 24 for transferring the developer image on the belt to a paper sheet P are provided around the intermediate transfer belt 16 in such a manner that the belt cleaner 22 and second transfer roller 24 can contact, and separate from, the belt surface.

The sheet feed unit 6 includes two sheet feed cassettes 26 and 28. Each of the cassettes 26 and 28 is provided with a pickup roller 31 at an upper right part (in the Figure) for picking up an uppermost paper sheet P that is contained in the cassette. A feed roller 32 and a separating roller 33, which are in contact with each other, are disposed at a position neighboring the downstream side in the direction in which the paper sheet is picked up by the pickup roller 31.

A sheet convey path 26 is provided at a position neighboring the right side (in the Figure) of the sheet feed cassette 26, 28. The sheet convey path 26 extends toward a secondary transfer point where the above-mentioned intermediate transfer belt 16 and secondary transfer roller 24 are put in contact. A plurality of pairs of convey rollers 34 that rotate with the sheet P clamped, an aligning sensor 35 that senses the arrival of the sheet P and an aligning roller pair 36 for feeding the sheet P to the secondary transfer point at a predetermined timing are successively disposed along the sheet convey path 26.

A fixing device 38 for fixing the developer, which is transferred to the paper sheet P, by heating and pressing the developer is provided on the sheet convey path 26 that extends upward through the secondary transfer point. The fixing device 38 includes a heating roller 38*b*, which incorporates a heater, and a press roller 38*a* that is disposed so as to press the heating roller 38*b*.

Figure 2:
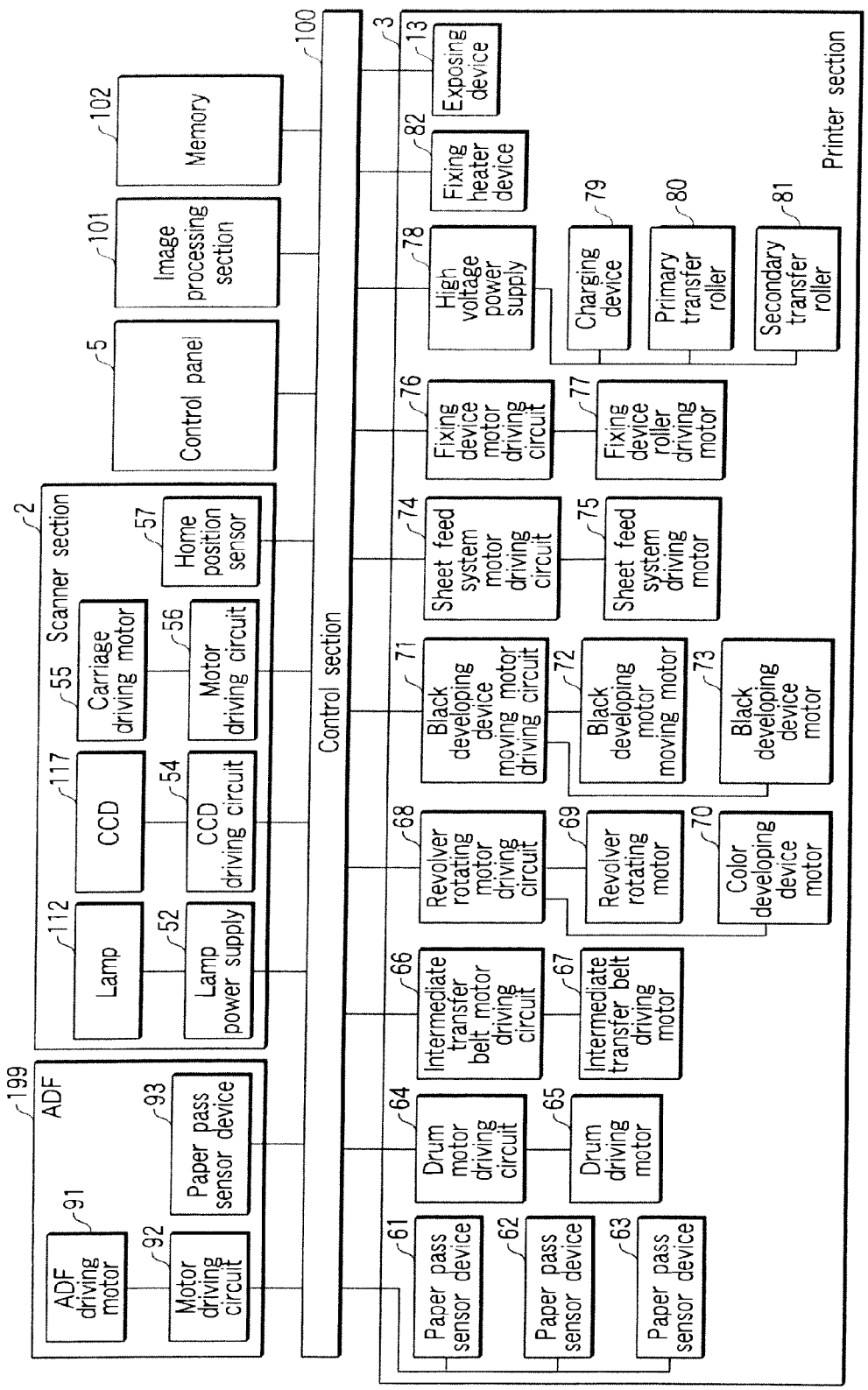
FIG. 2 is a block diagram that schematically shows the structure of a control system in the image forming apparatus.

FIG. 2 schematically shows the structure of a control system of the image forming apparatus 1.

The control system of the image forming apparatus 1 comprises a control section 100 that serves as control means for overall control, a scanner section 2, a printer section 3, an image processing section 101, a memory 102, an ADF 199, and a control panel 5.

The control system of the scanner section 2 comprises the light source (lamp) 112, a light source power supply (lamp power supply) 52, a CCD line sensor 117, a CCD driving circuit 54, a carriage driving motor 55, a motor driving circuit 56 and a home position sensor 57.

The control system of the printer section 3 comprises paper pass sensor devices 61, 62 and 63, a drum motor driving circuit 64, a drum driving motor 65, an intermediate transfer belt motor driving circuit 66, an intermediate transfer belt driving motor 67, a revolver rotating motor driving circuit 68, a revolver rotating motor 69, a color developing device motor 70, a black developing device moving motor driving circuit 71, a black developing motor moving motor 72, a black developing device motor 73, a sheet feed system motor driving circuit 74, a sheet feed system driving motor 75, a fixing device motor driving circuit 76, a fixing device roller driving motor 77, a high voltage power supply 78, a charging device 79, a primary transfer roller 80, a secondary transfer roller 81, a fixing heater device 82, and exposing device 13.

The ADF 199 comprises an ADF driving motor 91, a motor driving circuit 92, and a paper pass sensor device 93.

Figure 3:
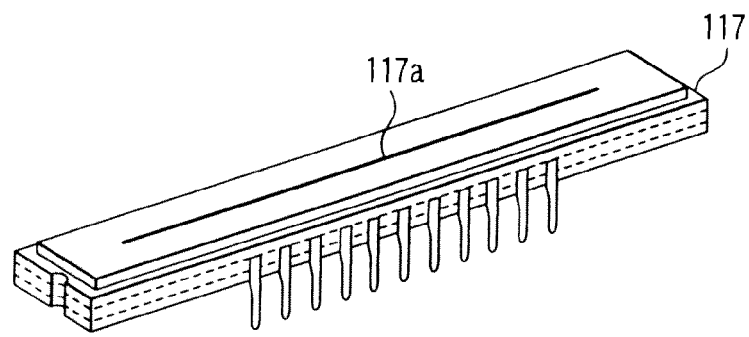
FIG. 3 shows a 4-line CCD sensor.
Figure 4:
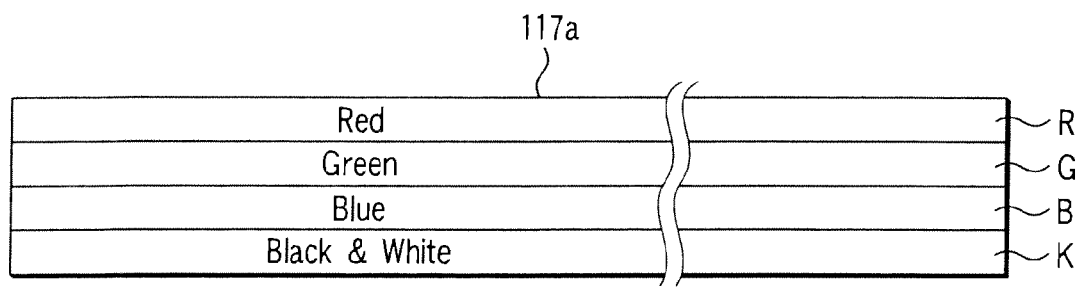
FIG. 4 shows the 4-line CCD sensor.

FIG. 3 shows an external appearance of the 4-line CCD sensor 117, and FIG. 4 is an enlarged view of a light-receiving portion 117*a*.

Four line sensors, that is, a line sensor K without an optical filter, i.e. a second light receiving element array, a line sensor R with an optical filter for providing sensitivity to red, a line sensor G with an optical filter for providing sensitivity to green, and a line sensor B with an optical filter for providing sensitivity to blue, are disposed on the light receiving portion of the 4-line CCD sensor 117. The line sensor R, line sensor G and line sensor B are first light receiving element arrays. In each line sensor, for example, photodiodes that serve as light receiving elements, are arranged in an effective pixel region for 7500 pixels with a pitch of 4.7 µm. Using the first light receiving element arrays and second light receiving element array, an image is read by image reading means.

In the 4-line CCD sensor 117, since the four line sensors are arranged, images that are to be read by the respective lines are misregistered in the sub-scan direction (i.e. vertical direction in FIG. 4). When a color image is to be read, image information that is read is, in usual cases, stored in line memories and a misregistration between the images is corrected. However, if there is non-uniformity (jitter) in the carrier movement speed or original movement speed in the sub-scan direction, complete correction is not always effected.

Next, the features of the 4-line CCD sensor 117 are explained.

Figure 5:
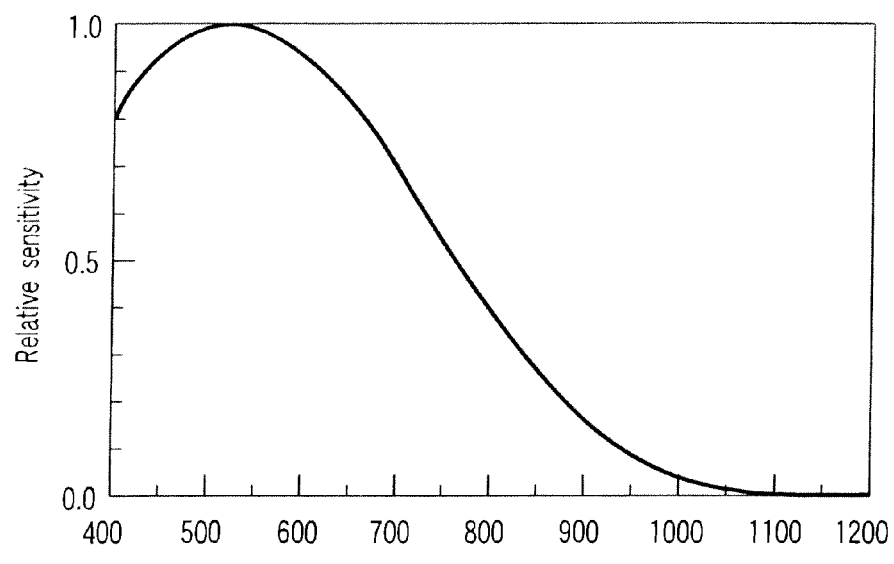
FIG. 5 shows spectral sensitivity characteristics of a line sensor K that is a structural element of the 4-line CCD sensor.
Figure 6:
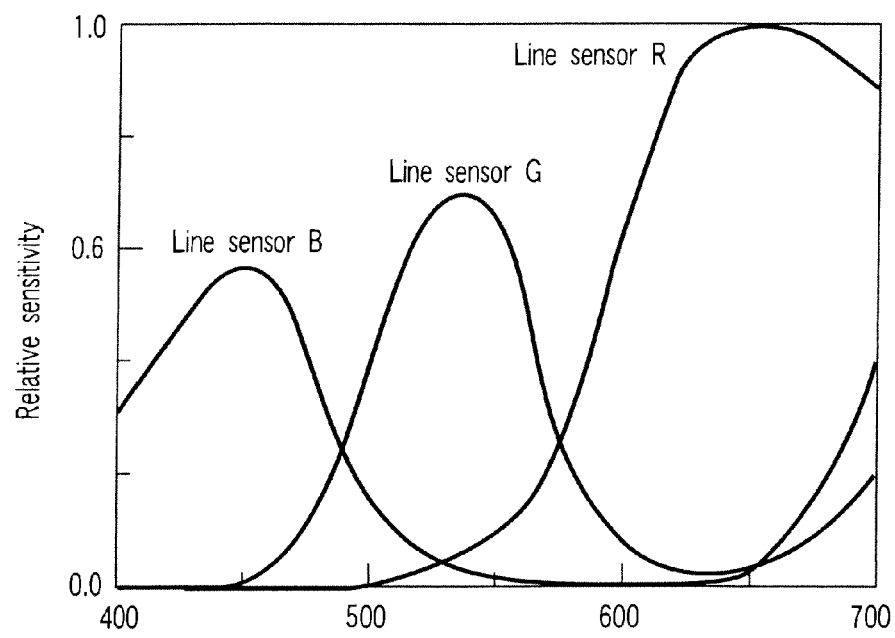
FIG. 6 shows spectral sensitivity characteristics of line sensors R, G and B.
Figure 7:
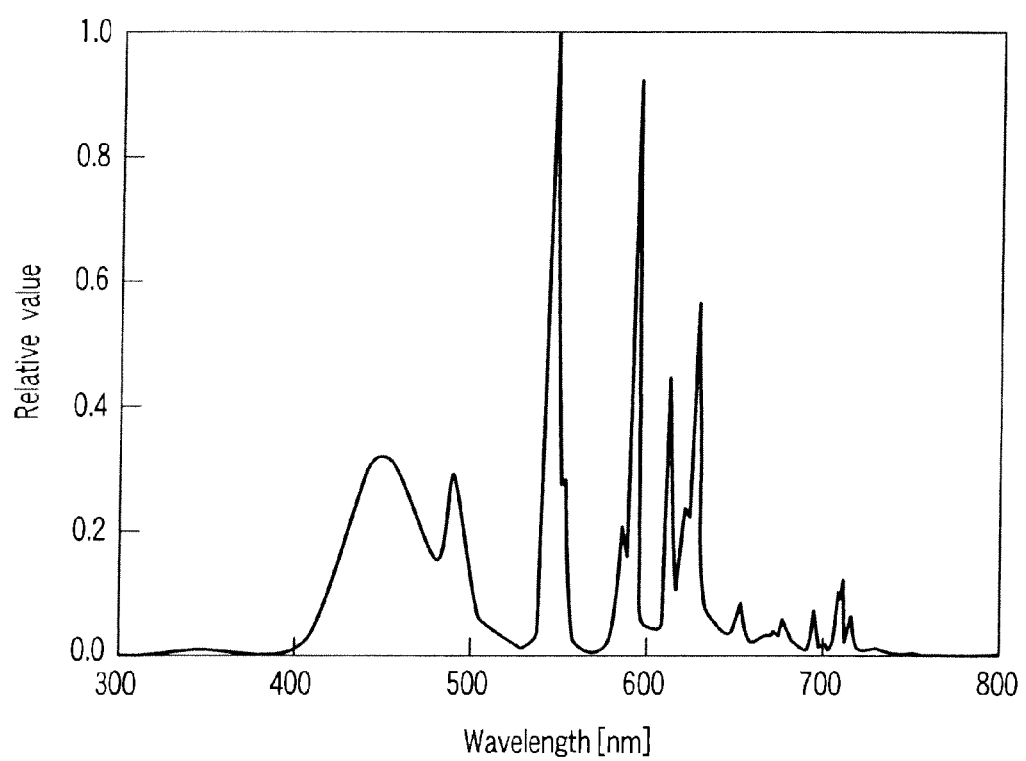
FIG. 7 shows a spectral distribution of a xenon lamp that is a light source.

FIG. 5 shows spectral sensitivity characteristics of a line sensor K that is a structural element of the 4-line CCD sensor 117, FIG. 6 shows spectral sensitivity characteristics of line sensors R, G and B, and FIG. 7 shows a spectral distribution of a xenon lamp that is the light source 112.

As is shown in FIG. 7, light that is emitted from the xenon lamp of the light source 112 includes wavelengths between about 400 nm and 730 nm. Assume the case in which such light from the light source 112 is reflected from a white original and made incident on the 4-line CCD sensor.

As is shown in FIG. 5 and FIG. 6, the line sensor K has sensitivity to wavelengths in a range between 400 nm or less and 1000 nm or more, whereas the line sensors R, G and B have sensitivity only to wavelengths of specific ranges. Taking this into account, it is clear that the magnitude of an output signal from the line sensor K is greater than that of an output signal from each of the other line sensors. In short, the line sensor K has a higher sensitivity than the other line sensors.

FIG. 8 schematically shows the structure of the 4-line CCD sensor 117.

The 4-line CCD sensor 117, as described above, comprises four line sensors, i.e. lines sensors K, B, G and R. The structure of the line sensor K is partly different from the structure of the line sensor B, G, R.

The line sensor K has shift gates 91K and 93K, which transfer a photoelectrically converted charge, and analog shift registers 92K and 94K, which transfer the transferred charge for one line on a pixel-by-pixel basis.

The line sensor B has a shift gate 91B, which transfers a photoelectrically converted charge, and an analog shift register 92B, which transfers the transferred charge for one line on a pixel-by-pixel basis.

The line sensor G has a shift gate 91G, which transfers a photoelectrically converted charge, and an analog shift register 92G, which transfers the transferred charge for one line on a pixel-by-pixel basis.

The line sensor R has a shift gate 91R, which transfers a photoelectrically converted charge, and an analog shift register 92R, which transfers the transferred charge for one line on a pixel-by-pixel basis.

The structure of the line sensor K is partly different from that of the line sensor R, G, B. To begin with, the structure of the line sensor R, G, B is described.

If light illuminates the line sensor R, G, B, the light receiving elements that constitute the line sensor generate charge on a pixel-by-pixel basis in accordance with the amount of radiation and the time of radiation. If an SH signal is input to the shift gate, the charge corresponding to each pixel is fed to the analog shift register via the shift gate. In sync with a transfer clock CLK1, 2, the analog shift register serially outputs the charge (image information) corresponding to the pixel from the associated line sensor.

The CLK1 and CLK 2 constitute differential signals of opposite phases, in order to move the charge at high speed.

A description in greater detail will be given.

If the line sensor R, G, B is illuminated with light, the light receiving elements of the line sensor generate charge on a pixel-by-pixel basis in accordance with the amount of radiation and the time of radiation.

The transfer of charge from the line sensor B, G, R to the analog shift register 92B, 92G, 92R is executed by the shift gate (SH) signal. Specifically, when the SH signal is input to the shift gate 91B, 91G, 91R, the charge corresponding to each pixel is fed to the analog shift register 92B, 92G, 92R via the shift gate 91B, 91G, 91R.

In sync with the transfer clock (CLK) 1, 2, the analog shift register 92B, 92G, 92R serially outputs the charge (image information) corresponding to the pixel from the associated line sensor (successive transfer). The transfer CLK1 and CLK 2 constitute differential signals of opposite phases, in order to move the charge at high speed.

The basic structure of the line sensor K is the same as that of the line sensor B, G, R. However, without varying the charge transfer speed of each of the analog shift registers 92K and 94K, the image signal for one line is read out to the outside within half the time for color image signals. For this purpose, the analog shift registers 92K and 94K are divided for odd-numbered pixels and even-numbered pixels of the line sensor K. Specifically, image signals are transferred from the line sensor K by the analog shift registers 92K and 94K at the same time. Thereby, double the transfer speed is realized.

The transfer of charge from the line sensor K to the analog shift registers 92K and 94K is executed by the shift gate (SH) signal that is common to the lines. In sync with the transfer CLK1, 2, the analog shift register 92K, 94K serially outputs the charge (image information) corresponding to the pixel from the line sensor K (successive transfer).

Figure 9:
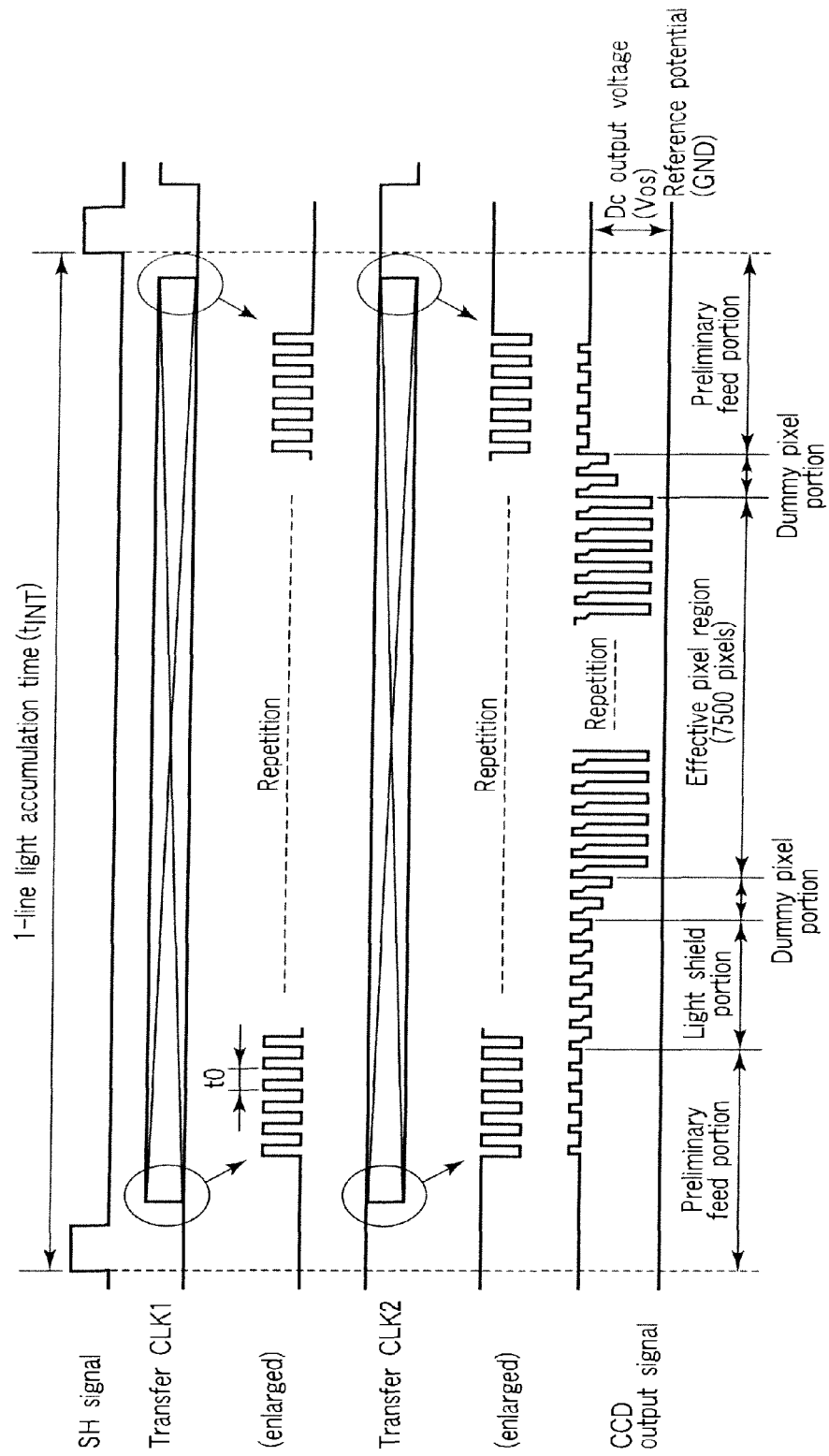
FIG. 9 is a view for explaining a signal output of a line sensor.

Referring now to FIG. 9, the signal outputs from the line sensors RGB are described in greater detail.

The line sensor is provided with a light shield pixel portion, which shields light receiving elements with aluminum, etc. so as to prevent incidence of light, a dummy pixel portion and a preliminary feeding portion, which are located at a stage preceding 7500 effective pixels.

In order to transfer all signal outputs of the line sensor to the outside, a number of transfer clocks, which is greater than the number of transfer clocks for 7500 pixels, is necessary. If the sum of the light shield pixel portion, preliminary feed portion and dummy pixel portion corresponds to 500 pixels, transfer clocks for 8000 pixels is required, and the time corresponding to these transfer clocks is a main factor for determining a light accumulation time (tINT) for one line.

Specifically, during the light accumulation time (tINT) for one line, the light receiving elements within the line sensor generate charge in accordance with the reflective light from the original. Upon input of the SH signal, the charge is transferred to the analog shift register. During the next light accumulation time (tINT) for one line, in sync with the transfer clock, the signal is output to the outside. This operation is repeated.

Next, the line sensor K is described. The basic operation of the line sensor K is the same as that of the line sensor R, G, B. As is understood from FIG. 8, the line sensor K is characterized by the two pairs of the shift gate and analog shift register.

If light is radiated on the line sensor K, the light receiving elements that constitute the line sensor K generate charge on a pixel-by-pixel basis in accordance with the amount of radiation and the time of radiation. If the SH signal is input to the shift gate K_ODD and shift gate K_EVEN, the charge corresponding to the odd-numbered pixel is fed to the analog shift register K_ODD via the shift gate, and the charge corresponding to the even-numbered pixel is fed to the analog shift register K_EVEN via the shift gate. In sync with the transfer clocks CLK1 and CLK2, the respective analog shift registers serially output the charges (image information) corresponding to the odd-numbered pixels and even-numbered pixels.

Figures 10, 11:
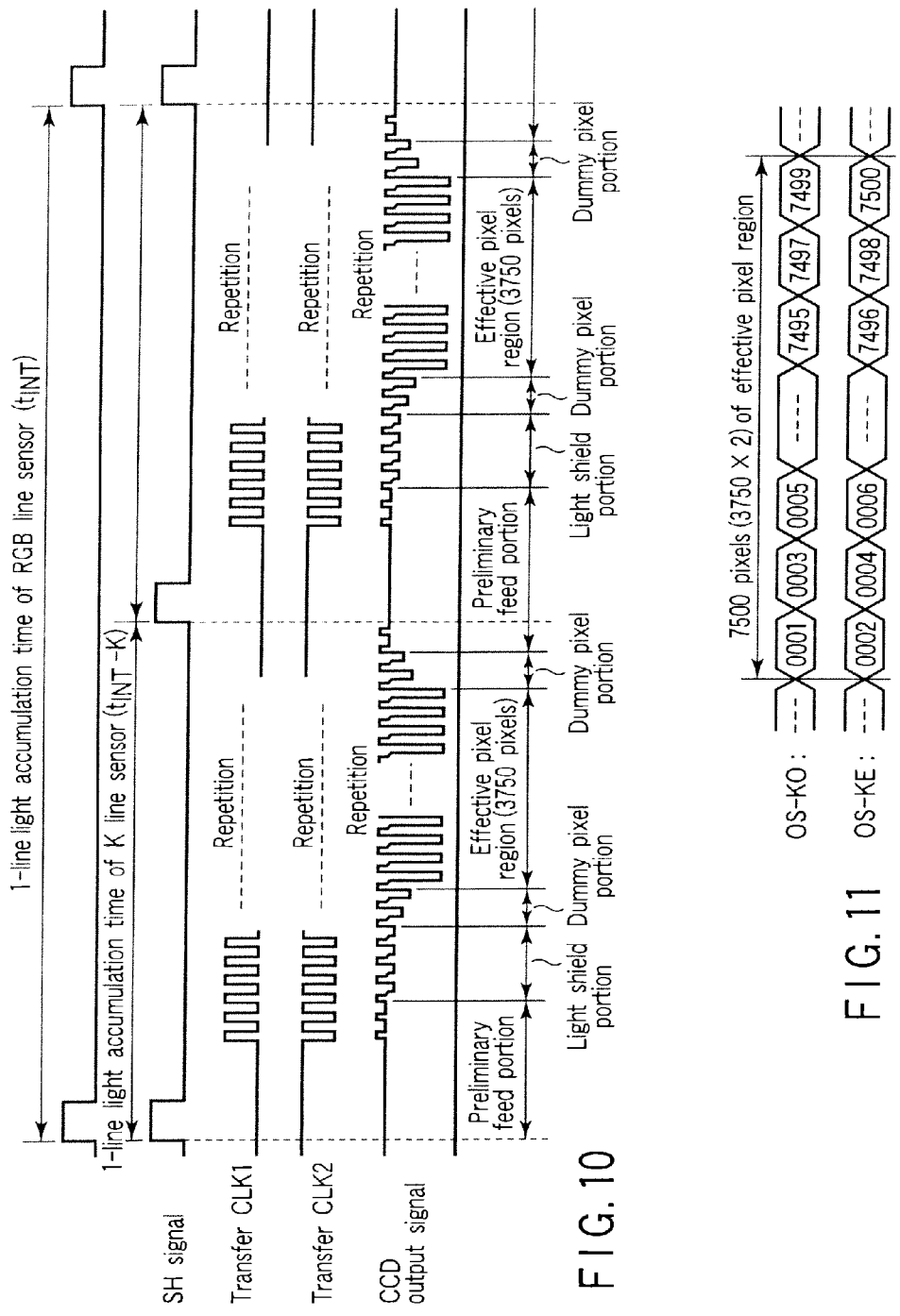
FIG. 10 is a view for explaining a signal output of a line sensor K.
FIG. 11 is a view for explaining the signal output of the line sensor K.

Referring to FIG. 10 and FIG. 11, the signal output in the case of the line sensor K is described in greater detail.

Like the line sensor R, G, B, the line sensor K is provided with a light shield pixel portion, which shields the light receiving elements with aluminum, etc. so as to prevent incidence of light, a dummy pixel portion and a preliminary feeding portion, which are located at a stage preceding 7500 effective pixels. The sum of the light shield pixel portion, preliminary feed portion and dummy pixel portion corresponds to 500 pixels.

In the case of the line sensor K, as described above, the transfer of charge is executed in a divided manner for the odd-numbered pixels and even-numbered pixels. Thus, the number of transfer clocks, which is necessary in order to serially output the charge (image information) for 8000 pixels, may be a number corresponding to 4000 pixels. Hence, the cycle of the SH signal, which is input to the shift gate, can be decreased, and the light accumulation time (tINT) for one line can be decreased. As has been described above, since the sensitivity of the line sensor K is high, no problem arises even if the light accumulation time (tINT) for one line is decreased.

FIG. 10 shows a case where the SH signal cycle (tINT-K) for the K line sensor is reduced to ½ of the above-described SH signal cycle (tINT) for the RGB line sensor. In addition, as shown in FIG. 11, the effective pixel region corresponds to 3750 pixels, and the signals corresponding to the odd-numbered pixels and even-numbered pixels are independently output from the associated analog shift registers.

As regards the 4-line CCD sensor 117, it has been explained that the use of the line sensor K realizes double the reading speed, compared to the case of using the line sensors R, G and B.

Specifically, in the case of using the line sensor K alone, the sensitivity of the line sensor K is higher than that of the other line sensors, and so no problem arises even if the light accumulation time is reduced to ½ of that for the other line sensors. Therefore, even if the reading speed (scanning speed) is doubled, the necessary image quality can be maintained.

If there is an allowance for the sensitivity of the line sensor K, the reading speed can further be increased.

For example, if the sensitivity of the line sensor K is four times higher than that of the line sensor R, G, B, the reading speed (scanning speed) can be increased four times.

The structure relating to this is shown in FIG. 12 and FIG. 13. In FIGS. 12 and 13, the outputs of the line sensor K are divided into those for odd-numbered pixels and those for even-numbered pixels, and the outputs are further divided into the first half and the second half. Thereby, the reading speed that is four times higher can be realized.

The structure of the line sensor K shown in FIG. 12, which differs from the structure shown in FIG. 8, is described in detail. Output lines for transferring charge are connected to both ends of each analog shift register. An input terminal for inputting the transfer clock is connected to a middle part of each analog shift register. By virtue of this structure, signals can be output not only from the first ones of the odd-numbered and even-numbered pixels, but also from the last ones of the odd-numbered and even-numbered pixels. Compared to the structure shown in FIG. 8, double the reading speed is realized. FIG. 12 omits depiction of the line sensors for the colors, other than the line sensor K, since their structure is the same as that shown in FIG. 8. In the structure shown in FIG. 12, the reading speed of the line sensor K is four times higher than that of the RGB line sensor.

Next, the general operation of the color printer section is described with reference to FIG. 1.

The process unit 4 prints out, onto the paper sheet P (transfer medium), an image based on image data that is read from an original by the scanner section 2, or image data that is input from an external device (not shown). The sheet feed unit 6 feeds the paper sheet P to the process unit 4.

The process unit 4 and sheet feed unit 6 are accommodated in the printer section 3. The double-side unit 8 and manual feed unit 9 are detachably provided on the right side of the printer section 3. The double-side unit 8 reverses the paper sheet P, on one side of which an image is formed by the process unit 4, and feeds it once again to the process unit 4. The manual feed unit 9 manually feeds the paper sheet P to the process unit 4.

Next, a general operation of the scanner section 2 is described.

An original that is to be read by the scanner section 2 is conveyed over the original table glass 110 by the ADF 199 at a fixed speed, or placed facedown on the original table glass 110. The original is illuminated by the light source 112, and reflective light from the original is focused on the 4-line CCD 117, which functions as a photoelectric conversion element, via the mirrors 113, 114 and 115 and lens 116.

When the original that is placed on the original table glass 110 is to be read, the first carriage 1A comprising the light source 112 and mirror 113 and the second carriage 1B comprising the mirror 114 and mirror 115 are moved from the left to the right by a driving motor (not shown). Thereby, the original is scanned by illumination light from the light source 112 (sub-scan direction). The speed of movement of the first carriage 1A is double the speed of movement of the second carriage 1B, and the optical path length from the original to the 4-line CCD 117 is configured to be constant at all times. When the original is conveyed by the ADF 199, the position of illumination light from the light source 112 does not move, and scan is executed while the original is being moved.

Next, a description is given of the operation in the case where the image output section outputs a monochromatic image and the operation in the case where the image output section outputs a color image.

The operation in the case of outputting a monochromatic image is as follows.

To start with, the revolver is rotated to a home position where none of the developing devices 15Y, 15M and 15C is opposed to the drum surface 11a. The black developing device 14 is moved upward and opposed to the drum surface 11a.

The belt cleaner 22 is rotated clockwise about a shaft 22a and brought into contact with the intermediate transfer belt 16. The secondary transfer roller 24 is moved to the left (in the Figure) and put in rotational contact with the intermediate transfer belt 16.

The exposing device 13 scans a laser beam on the drum surface 11a on the basis of image data for black, and forms an electrostatic latent image for black on the drum surface 11a. Subsequently, a black developer is applied to the electrostatic latent image on the drum surface 11a via the black developing device 14, and a black developer image is formed on the drum surface 11a.

The black developer image, which has been thus formed on the drum surface 11a, is moved by the rotation of the photoconductor drum 11 to a primary transfer point for contact with the intermediate transfer belt 16. At the primary transfer point, a bias voltage with a polarity that is opposite to the polarity of the potential of the black developer image is applied via the primary transfer roller. Thereby, the black developer image on the drum surface 11a is transferred to the intermediate transfer belt 16.

The drum cleaner 17 removes the black developer, which has not been transferred and remains on the drum surface 11a that has passed over the primary transfer point, and erases the residual charge at the same time. The drum surface 11a is then uniformly charged by the charger 12 for the next formation of an electrostatic latent image for black.

If a black image is to be formed in succession, the same series of processes as described above are performed, that is, exposure→development→transfer to intermediate transfer belt 16. Thus, the next black developer image is transferred to the intermediate transfer belt 16.

The black developer image, which has been transferred to the intermediate transfer belt, is moved by the rotation of the intermediate transfer belt 16 and is passed through a secondary transfer point that is located between the intermediate transfer belt 16 and the secondary transfer roller 24.

At this time, the paper sheet P, which is picked up by the pickup roller 31 from the cassette 26, 28, is conveyed upward along the vertical sheet convey path 26 by the convey roller pair 34. The paper sheet P is once registered by the aligning rollers 36, and then fed to the secondary transfer region at a predetermined timing.

A bias voltage with a polarity that is opposite to the polarity of the potential of the black developer image is applied via the secondary transfer roller 24, and the black developer on the intermediate transfer belt 16 is transferred to the paper sheet P. After the developer is transferred, the black developer remaining on the intermediate transfer belt 16 is removed by the belt cleaner 22.

The paper sheet P with the transferred black developer is heated and pressed, while being passed through the fixing device 38. The developer images of the respective colors are fixed on the paper sheet P, and the black image is formed. The paper sheet P with the black image is discharged to a discharge tray 44 via a discharge roller 42 that is provided on the downstream side of the fixing device 38.

As has been described above, the black image formation can successively be executed, without the need to move the revolver, belt cleaner and secondary transfer roller.

Next, the operation in the case of outputting a color image is described.

To start with, the black developing device 14 is moved downward and spaced apart from the drum surface 11a. The revolver 15 is rotated clockwise, and the yellow developing device 15Y is opposed to the drum surface 11a. The belt cleaner 22 is rotated counter-clockwise about the shaft 22a and spaced apart from the intermediate transfer belt 16. The secondary transfer roller 24 is moved in a direction away from the sheet convey path 26 (to the right in the Figure), and spaced apart from the intermediate transfer belt 16.

The exposing device 13 scans a laser beam on the drum surface 11a on the basis of image data for yellow, and forms an electrostatic latent image for yellow on the drum surface 11a. Subsequently, a yellow developer is applied to the electrostatic latent image on the drum surface 11a via the yellow developing device 15Y, and a yellow developer image is formed on the drum surface 11a.

The yellow developer image, which has been thus formed on the drum surface 11a, is moved by the rotation of the photoconductor drum 11 to the primary transfer point for contact with the intermediate transfer belt 16. At the primary transfer point, a bias voltage with a polarity that is opposite to the polarity of the potential of the yellow developer image is applied via the primary transfer roller 21. Thereby, the yellow developer image on the drum surface 11a is transferred to the intermediate transfer belt 16.

The drum cleaner 17 removes the yellow developer, which has not been transferred and remains on the drum surface 11a that has passed over the primary transfer point, and erases the residual charge at the same time. The drum surface 11a is then uniformly charged by the charger 12 for subsequent formation of an electrostatic latent image for magenta. The revolver 15 is rotated, and the magenta developing device 15M is opposed to the drum surface 11a. In this state, the same series of processes as for yellow are performed, that is, exposure→development→transfer to intermediate transfer belt 16. Thus, the magenta developer image is overlaid on the yellow developer image on the intermediate transfer belt 16. In like manner, after the magenta developer image is transferred, a cyan developer image is transferred and overlaid.

The revolver is rotated to the home position where none of the developing devices 15Y, 15M and 15C is opposed to the drum surface 11a. Instead, the black developing device 14 is moved upward and opposed to the drum surface 11a. In this state, the same processes as described above are executed, and a black developer image is transferred to the intermediate transfer belt 16 and overlaid on the yellow developer image, magenta developer image and cyan developer image.

The black developing device 14 is used for the following reason. When K (black) is represented by overlaying YMC, exact color overlay is necessary and possible color misregistration would result in degradation in image quality. In addition, as regards black, the amount of toner is saved if K alone is used, compared to the case where the three colors of YMC are used.

If the developer images of all colors are overlaid on the intermediate transfer belt, the secondary transfer roller 24 is moved to the left (in the Figure) and put in rotational contact with the intermediate transfer belt 16. In addition, the belt cleaner 22 is put in contact with the intermediate transfer belt 16. In this state, the overlaid developer images of all colors on the intermediate transfer belt are moved by the rotation of the intermediate transfer belt 16, and passed through the secondary transfer point that is located between the intermediate transfer belt and the secondary transfer roller 24.

At this time, the paper sheet P, which is picked up by the pickup roller 31 from the cassette 26, 28, is conveyed upward along the vertical sheet convey path 26 by the convey roller pair 34. The paper sheet P is once registered by the aligning rollers 36, and then fed to the secondary transfer region at a predetermined timing.

A bias voltage with a polarity that is opposite to the polarity of the potential of the developer images of the respective colors is applied via the secondary transfer roller 24, and the developers of the respective colors on the intermediate transfer belt 16 are transferred to the paper sheet P. After the developers are transferred to the paper sheet P, the developers remaining on the intermediate transfer belt 16 are removed by the belt cleaner 22.

The paper sheet P with the transferred color developers is heated and pressed, while being passed through the fixing device 38. The developer images of the respective colors are fixed on the paper sheet P, and a color image is formed. The paper sheet P with the color image is discharged to the discharge tray 44 via the discharge roller 42 that is provided on the downstream side of the fixing device 38.

As has been described above, when a color image is to be formed, it is necessary to overlay yellow, magenta, cyan and black developer images, and the processes of exposure→development→transfer to intermediate transfer belt 16 need to be performed four times. On the other hand, when a black single-color image is to be formed, the processes of exposure→development→transfer to intermediate transfer belt 16 are executed only once. Thus, the time for the processes can be reduced to ¼, and high-speed, high-image-quality monochromatic copy can be executed.

Also in a case where a monochromatic image is to be formed, it should suffice if the processes of exposure→development→transfer to intermediate transfer belt 16 are executed with respect to one or two colors of the colors in the above-described color image forming operation on the basis of image data for black. Therefore, high-speed, high-image-quality monochromatic copy can be executed.

Next, a description is given of the present invention in which the MFP includes the printer section 3 with a structure different from the above-described structure.

Figure 14:
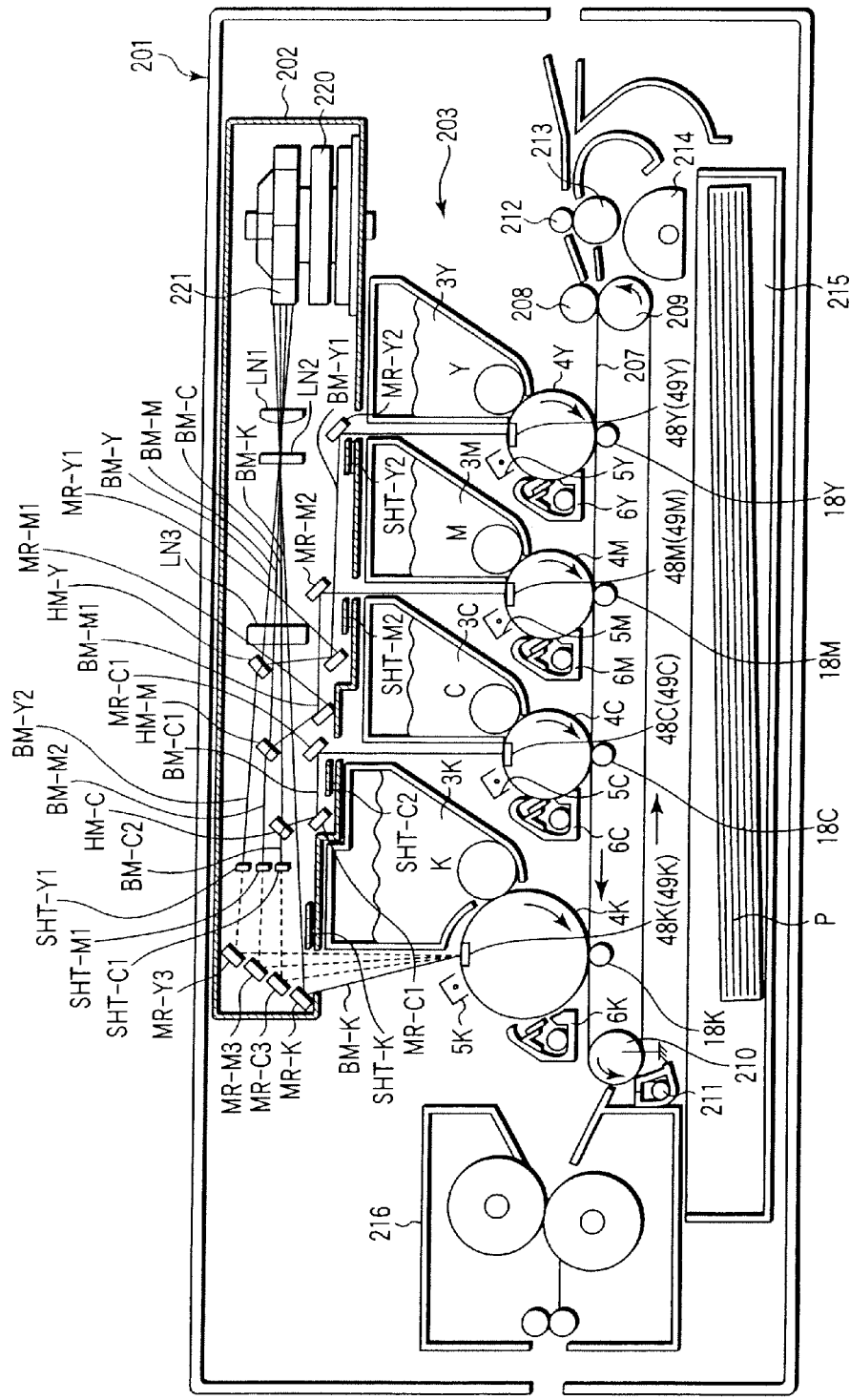
FIG. 14 shows an internal structure of an image forming apparatus according to a second embodiment of the present invention.

FIG. 14 shows the internal structure of an image forming apparatus according to a second embodiment of the present invention. This embodiment differs from the first embodiment in that the respective color image forming sections (the process unit) of the printer section are arranged in a 4-series tandem fashion.

The image forming apparatus shown in FIG. 14 is described as an image forming apparatus 201 of the second embodiment, as will be explained later in detail. The scanner section is the same as that in the first embodiment, so FIG. 14 and FIG. 16 omit depiction thereof. This image forming apparatus 201 is an MFP additionally having a copying function.

In FIG. 14, the image forming apparatus 201 comprises an optical unit 202, an image forming unit 203 that is necessary for forming images of respective colors, a transfer belt 207, an attraction roller 208, transfer belt rollers 209 and 210, a transfer belt cleaner 211, aligning rollers 212 and 213, a sheet feed roller 214, a sheet feed cassette 215 that contains paper sheets P and feeds them, and a fixing device 216.

The image forming unit 203 includes, for the respective colors, developing devices 3Y, 3M, 3C and 3K, photoconductor drums 4Y, YM, 4C and 4K, chargers 5Y, 5M, 5C and 5K, cleaners 6Y, 6M, 6C and 6K, and transfer rollers 18Y, 18M, 18C and 18K.

For each color, an image forming station is composed of the developing device, photoconductor drum, charger, cleaner and transfer roller. For instance, in the case of yellow, the image forming station for yellow is composed of the developing device 3Y, photoconductor drum 4Y, cleaner 6Y, transfer roller 18Y, etc.

Figure 15:
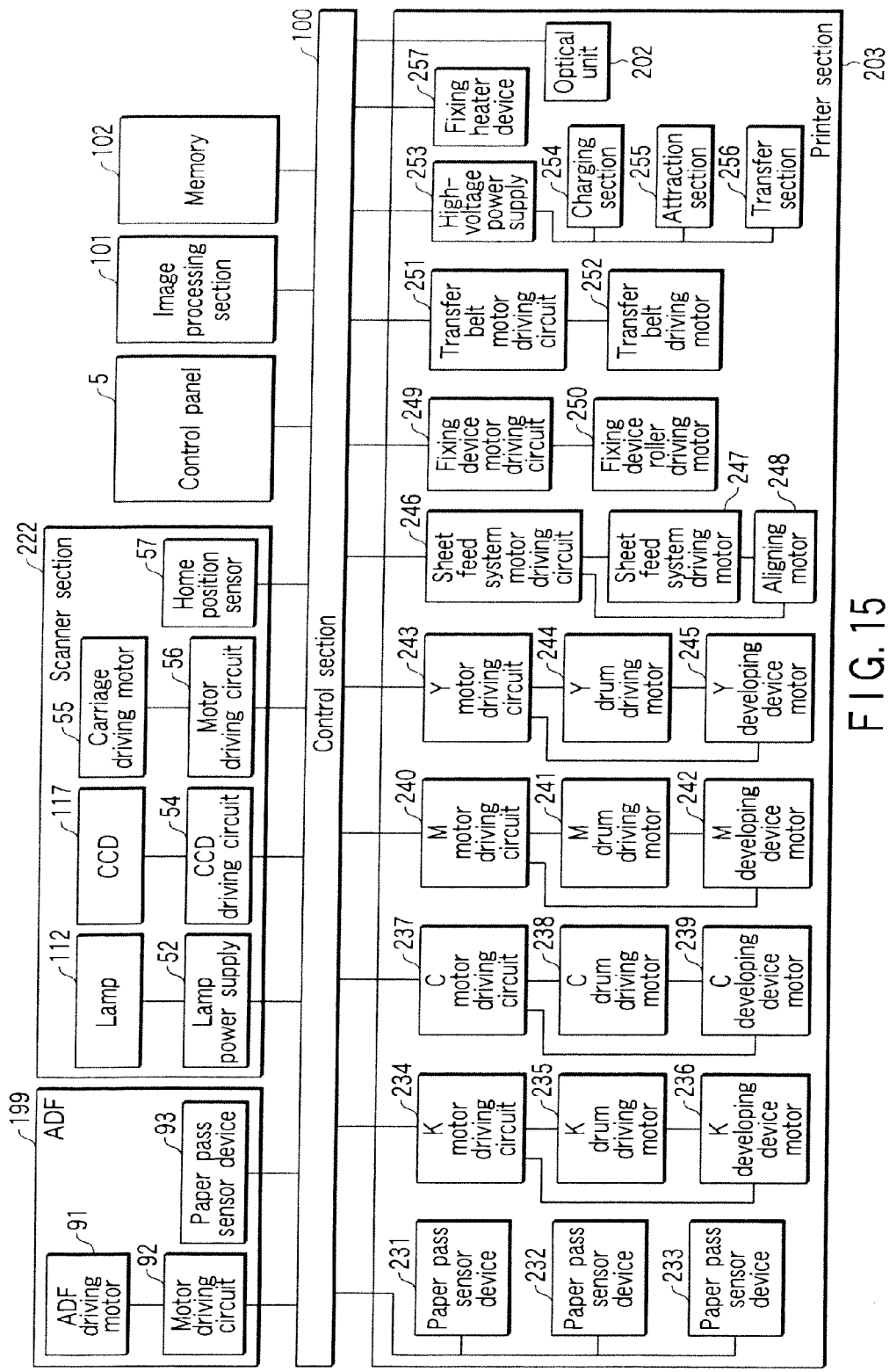
FIG. 15 is a block diagram that schematically shows the structure of a control system in the image forming apparatus.

FIG. 15 schematically shows the structure of a control system of the image forming apparatus 201.

The control system of the image forming apparatus 201 comprises a control section 100 that serves as control means for overall control, a scanner section 222, a printer section 203, an image processing section 101, a memory 102, an ADF 199, and a control panel 5.

The control system of the scanner section 222 has the same structure as that of the scanner section 2 shown in FIG. 2, so the common parts are denoted by like reference numerals and a description thereof is omitted.

The printer section 203 comprises paper pass sensor devices 231, 232 and 233, a motor driving circuit 234 for black, a photoconductor drum driving motor 235 for black (K drum driving motor), a developing device motor 236 for black (K developing device motor), a motor driving circuit 237 for cyan, a photoconductor drum driving motor 238 for cyan (C drum driving motor), a developing device motor 239 for cyan (C developing device motor), a motor driving circuit 240 for magenta, a photoconductor drum driving motor 241 for magenta (M drum driving motor), a developing device motor 242 for magenta (M developing device motor), a motor driving circuit 243 for yellow, a photoconductor drum driving motor 244 for yellow (Y drum driving motor), a developing device motor 245 for yellow (Y developing device motor), a sheet feed system motor driving circuit 246, a sheet feed system driving motor 247, an aligning motor 248, a fixing device motor driving circuit 249, a fixing device roller driving motor 250, a transfer belt motor driving circuit 251, a transfer belt driving motor 252, a high-voltage power supply 253, a charging section 254, an attraction section 255, a transfer section 256, a fixing heater device 257, and an optical unit 202 that serves as an exposing device.

The control system of the ADF 199 has the same structure as that of the ADF 199 shown in FIG. 2, so the common parts are denoted by like reference numerals and a description thereof is omitted.

Next, an operation of forming a color image using this apparatus is described.

The photoconductor drums 4Y, 4M, 4C and 4K and the transfer belt 207 are rotated by the driving motors at predetermined circumferential speeds. The chargers 5Y, 5M, 5C and 5K, which are disposed to face the surfaces of the photoconductor drums 4Y, 4M, 4C and 4K, charge the surfaces of the photoconductor drums 4Y, 4M, 4C and 4K at predetermined potentials.

Four beams, which are output from the optical unit 202, are focused at exposure positions on the photoconductor drums 4Y, 4M, 4C and 4K, which are members to be exposed, as scan beam spots with necessary resolutions, thus executing scan exposure. Thereby, electrostatic latent images corresponding to image signals are formed on the photoconductor drums 4Y, 4M, 4C and 4K.

The electrostatic latent images formed on the photoconductor drums 4Y, 4M, 4C and 4K are developed into toner images by toner, or a developing agent, which is supplied from the developing devices 3Y, 3M, 3C and 3K. For instance, the electrostatic latent image formed on the photoconductor drum 4Y is developed as a yellow toner image by the developing device 3Y. Similarly, the electrostatic latent image formed on the photoconductor drum 4M is developed as a magenta toner image by the developing device 3M, the electrostatic latent image formed on the photoconductor drum 4C is developed as a cyan toner image by the developing device 3C, and the electrostatic latent image formed on the photoconductor drum 4K is developed as a black toner image by the developing device 3K.

On the other hand, the paper sheet P that is contained in the sheet feed cassette 215 is conveyed to the aligning rollers 212, 213 by the rotation of the sheet feed roller 214, and is registered (position adjustment). Then, the paper sheet P is conveyed to the attraction roller 208 and transfer belt roller 209 by the rotation of the aligning rollers 212, 213. A predetermined potential difference is applied between the attraction roller 208 and transfer belt roller 209. By the rotation of the rollers 208 and 209 and transfer belt roller 210, the paper sheet P is conveyed to the downstream side in the state in which the paper sheet P is attracted on the transfer belt 207.

The toner images of the respective colors on the photoconductor drums 4Y, 4M, 4C and 4K, which have been developed by the developing devices 3Y, 3M, 3C and 3K, are transferred to the paper sheet P at regions where the transfer belt 207 contacts the transfer rollers 18Y, 18M, 18C and 18K.

Subsequently, the paper sheet P is heated and pressed, while passing through the fixing device 216. The toner image on the paper sheet P is thus melted and exactly fixed on the paper sheet P. Upon completion of the transfer to the paper sheet P, the residual toner on the surface of each photoconductor drum 4Y, 4M, 4C, 4K is removed by the cleaner 6Y, 6M, 6C, 6K, and each photoconductor drum 4Y, 4M, 4C, 4K is restored to the initial state and stands by for the next image formation. In addition, unnecessary toner that adheres to the transfer belt 207, which has completed the conveyance of the paper sheet, is removed while the transfer belt 207 is passing through the transfer belt cleaner 211. Thus, the transfer belt 207 is set in such a state as to be able to execute the next sheet conveyance.

The above-described process is repeated to successively execute operations for color image formation.

Next, the detailed structure of the optical unit 202 and the beam paths at the time of color image formation are described.

The optical unit 202 includes, for instance, four semiconductor lasers (not shown). Beams from the semiconductor lasers are reflected by the surface of a polygon mirror 221, which is rotated by a polygon motor 220, and scan the surfaces of the photoconductor drums 4Y, 4M, 4C and 4K, which are surfaces to be exposed.

Assume now that a beam that may possibly reach the photoconductor drum 4Y is BM-Y, a beam that may possibly reach the photoconductor drum 4M is BM-M, a beam that may possibly reach the photoconductor drum 4C is BM-C, and a beam that may possibly reach the photoconductor drum 4K is BM-K. In this case, the beams that are scanned by the polygon mirror 221 pass through lenses LN1, LN2 and LN3.

The beam BM-Y that may possibly reach the photoconductor drum 4Y passes through the lenses LN1, LN2 and LN3, and is then reflected by a half-mirror HM-Y by about 50%. The reflected beam travels as a beam BM-Y1. Thereafter, the beam BM-Y1 is reflected by a mirror MR-Y1 and a mirror MR-Y2, and reaches the photoconductor drum 4Y. On the other hand, a beam BM-Y2, which has passed through the half-mirror HM-Y, is blocked by a blocking member (shutter) SHT-Y1, and reaches none of the drums.

In addition, the beam BM-M that may possibly reach the photoconductor drum 4M passes through the lenses LN1, LN2 and LN3, and is then reflected by a half-mirror HM-M by about 50%. The reflected beam travels as a beam BM-M1. Thereafter, the beam BM-M1 is reflected by a mirror MR-M1 and a mirror MR-M2, and reaches the photoconductor drum 4M. On the other hand, a beam BM-M2, which has passed through the half-mirror HM-M, is blocked by a blocking member (shutter) SHT-M1, and reaches none of the drums.

The beam BM-C that may possibly reach the photoconductor drum 4C passes through the lenses LN1, LN2 and LN3, and is then reflected by a half-mirror HM-C by about 50%. The reflected beam travels as a beam BM-C1. Thereafter, the beam BM-C1 is reflected by a mirror MR-C1 and a mirror MR-C2, and reaches the photoconductor drum 4C. On the other hand, a beam BM-C2, which has passed through the half-mirror HM-C, is blocked by a blocking member (shutter) SHT-C1, and reaches none of the drums.

The beam BM-K that is to reach the photoconductor drum 4K passes through the lenses LN1, LN2 and LN3, and is then reflected by a mirror MR-K. The reflected beam reaches the photoconductor drum 4K.

In this way, the beams from the four semiconductor lasers (not shown) are reflected by the surface of the polygon mirror 221 that is rotated by the polygon motor 220. The reflected beams travel through the associated paths, and scan the associated photoconductor drums. Thus, a color image can be formed.

Next, referring to FIG. 16, the operation and the beam path in the optical system at the time of forming a monochrome (black) image at high speed using the copying machine of the same structure are described.

The photoconductor drum 4K, transfer belt 207 and fixing device 216 are rotated by the driving motors (235, 252, 250) at a speed that is four times higher than the speed at the time of the above-described color image formation. On the other hand, the photoconductor drums 4Y, 4M and 4C, which are not to be used, are not rotated, nor are the developing rollers of the developing devices 3Y, 3M and 3C rotated.

Unlike the case of the color image formation, the four beams, which are output from the optical unit 202, are all focused at an exposure position on the photoconductor drum 4K as a scan beam spot with necessary resolution, thus executing scan exposure. Specifically, the photoconductor drum 4K is scanned and exposed by the four beams at the same time, and an electrostatic latent image corresponding to the image signal is formed on the photoconductor drum 4K. The beam paths within the optical unit 202 in this case will be described later.

The electrostatic latent image formed on the photoconductor drum 4K is developed by a toner (developer) that is supplied from the developing device 3K, and a K toner image is formed. In the monochrome mode, the transfer belt 207, attraction roller 208, transfer belt roller 209 and transfer rollers 18Y, 18M and 18C are moved downward by the driving motors (not shown) so as not to contact the photoconductor drums 4Y, 4M and 4C. The transfer belt 207 contacts the photoconductor drum 4K alone.

The toner image on the photoconductor drum 4K, which has been developed by the developing device 3K, is transferred to the paper sheet P at a point where the transfer belt 207 contacts the transfer roller 18K.

Subsequently, the paper sheet P is heated and pressed, while passing through the fixing device 216. The toner image on the paper sheet P is thus melted and exactly fixed on the paper sheet P.

The operations in the above-described processes are repeated to successively execute monochrome image forming operations at a speed that is four times higher than the speed in the color image forming operation.

Next, the beam paths within the optical unit at the time of forming a monochrome (black) image are described. As is shown in FIG. 16, the positions of the blocking members SHT-Y1, SHT-Y2, SHT-M1, SHT-M2, SHT-C1 and SHT-C2 are different from those in the color image formation.

For example, the beam BM-Y1, which reaches the photoconductor drum 4Y at the time of the color image formation, is blocked by the blocking member SHT-Y2 and does not reach the photoconductor drum 4Y. On the other hand, the beam BM-Y2, which has passed through the half-mirror HM-Y, is reflected by a mirror MR-Y3 and reaches the photoconductor drum 4K. Similarly, the beams BM-M and BM-C do not reach the photoconductor drums 4M and 4C, and reach the photoconductor drum 4K. the beam BM-K, which reaches the photoconductor drum 4K at the time of the color image formation, undergoes no change and reaches the photoconductor drum 4K.

As has been described above, in the monochrome image forming mode, the optical paths to the photoconductor drums 4Y, 4M and 4C are shut off by the blocking members SH-Y2, SHT-M2 and SH-C2. On the other hand, the blocking members SHT-Y1, SHT-M1 and SHT-C1 are shifted to secure the optical paths to the photoconductor drum 4K. The blocking members SHT-Y1, SHT-M1, SHT-C1, SHT-Y2, SHT-M2 and SHT-C2 are opened/closed by driving means (not shown).

As has been described above, when the monochrome mode is designated, the beams from the four semiconductor lasers (not shown) are reflected by the surface of the polygon mirror 221 that is rotated by the polygon motor 220. The reflected beams travel through the respective optical paths, and all the four beams scan the photoconductor drum 4K. Compared to the color mode, the monochrome image formation can be executed at a speed that is four times higher.

At the time of monochrome image formation, only the photoconductor drum 4K is used, and the photoconductor drums 4Y, 4M and 4C are not used. The reason is that the rotation of these photoconductor drums is stopped and these photoconductor drums are spaced apart from the transfer belt, thereby to prevent degradation in characteristics due to wear of the surfaces of the photoconductor drums.

Figure 17:
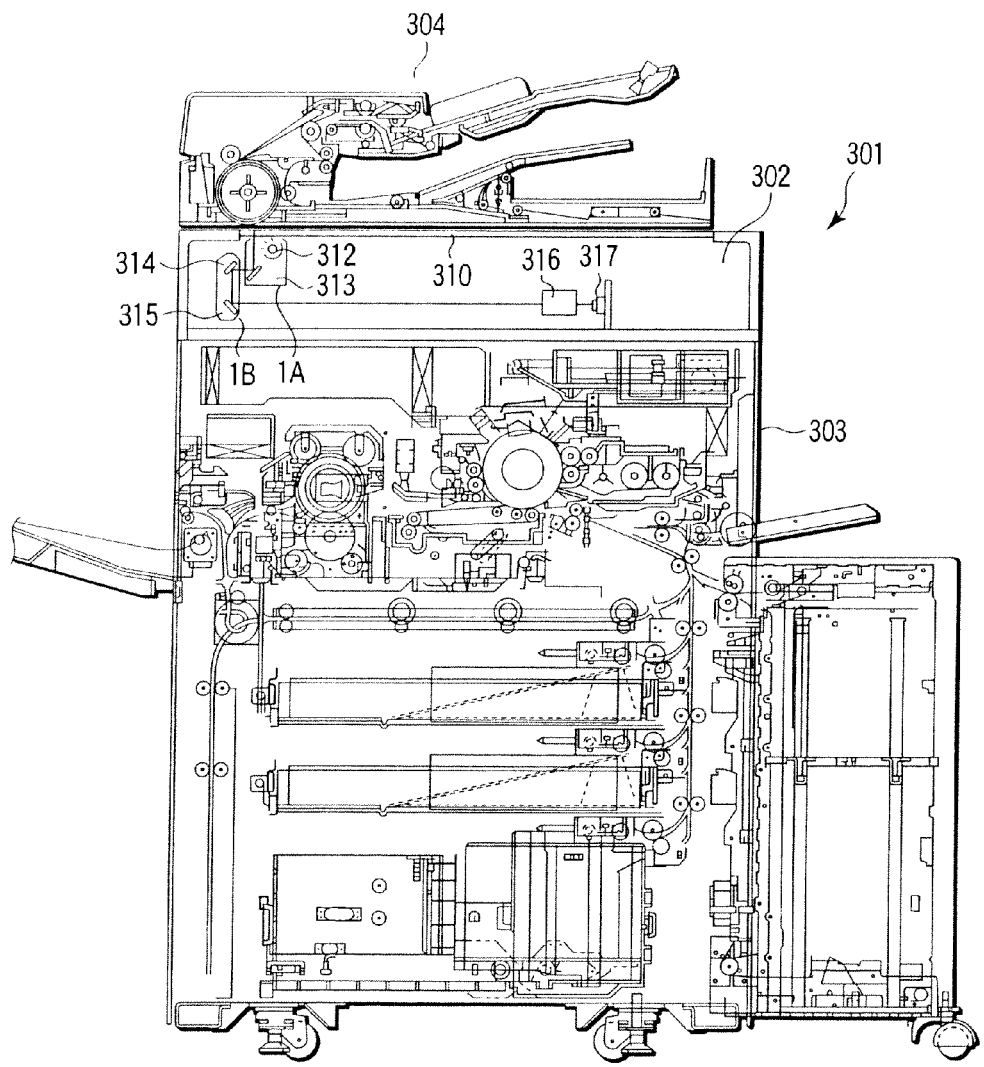
FIG. 17 shows an internal structure of an image forming apparatus according to a third embodiment of the present invention.

FIG. 17 shows the internal structure of an image forming apparatus 301 according to a third embodiment using a 4-line CCD. Specifically, FIG. 17 shows the structure of a monochromatic MFP having a color scan function.

The image forming apparatus shown in FIG. 17 is described as the image forming apparatus 301 of the third embodiment, as will be explained later in detail.

When a copying operation is executed, monochromatic image information that is read by a color scanner section 302 is subjected to a predetermined image process. The processed information is output from a monochromatic print section 303. When the apparatus operates as a scanner, RGB color image data that is output from the color scanner section 302 is output to a network (not shown) as color scanner information.

The operation of the image forming apparatus (1, 201, 301) according to the embodiment of the invention will now be described.

FIG. 18 shows the control panel of a color MFP (image forming apparatus) shown in FIGS. 1, 14 and 16.

The control panel 5 comprises an auto color button 151, a full color button 152, a black button 153, a mono-color button 154, a copy/scanner button 155, a display section 156, ten-keys 157, a C-button 158, a reset button 159, a stop button 160, and a start button 161. The auto color button 151, full color button 152, black button 153 and mono-color button 154 are parts of copy mode selection means.

The buttons 151 to 155, which are arranged on the left side, are buttons for designating the operation of the color MFP.

If the auto color button 151 is pressed, the color MFP automatically determines whether an original is color or monochromatic. In a mode suitable for the determination result, the copying operation is executed. Specifically, in the case of a color original, the copying operation is executed in a color copy mode. In the case of a monochromatic original, the copying operation is executed in a monochromatic copy mode.

If the full color button 152 is pressed, the color MFP is set in a mode for executing color copy.

If the black button 153 is pressed, the color MFP is set in a mode for executing monochromatic copy.

If the mono-color button 154 is pressed, the color MFP is set in a mode for executing monochromatic color copy. The color can be designated on a touch panel of the display section 156.

The copy/scanner button 155 is a button for selecting an operation in which the color MFP functions as a scanner, or an operation in which the color MFP functions as a copying machine. By default, the operation in which the color MFP functions as a copying machine is designated.

The display section 156 is formed as a touch panel. The display section 156 displays the state of the color MFP, and enables designation of operational details. For instance, the designation of the copying magnification and density, the selection of paper sheets and the color selection for monochromatic color copy can be executed.

The buttons of "0" to "9" (ten-keys) 157 are used for inputting the number of copies. The C-button is a clear button and is used for clearing the input of the number of copies.

The reset button 159 is used in order to restore all the conditions, which are set on the control panel, to initial (default) conditions.

The stop button 160 is used to stop the copying operation before it is completed.

The start button 161 is used to start the copying operation and scan operation.

FIG. 19 shows the control panel of the monochromatic MFP (image forming apparatus 301) shown in FIG. 17. The same parts as those of the control panel 5 shown in FIG. 18 are denoted by like reference numerals, and a description thereof is omitted.

The buttons, which are arranged on the left side, are buttons for designating the operation of the monochromatic MFP. Specifically, these buttons are a copy button 351, a FAX button 352 and a scanner button 353.

If the copy button 351 is pressed, the monochromatic MFP is set in a mode for executing a monochromatic copying operation.

If the FAX button 352 is pressed, the monochromatic MFP is set in a mode for executing a FAX operation.

If the scanner button 353 is pressed, the monochromatic MFP is set in a mode for executing a scanner operation. In the case where the present invention is the monochromatic MFP, the scanner is set in the color image reading mode (i.e. the RGB sensors are effective).

The other display part and buttons are basically the same as in the above-described color MFP, so a description thereof is omitted.

FIG. 20 is a block diagram that shows a part of the system configuration of a conventional color MFP.

When an auto color copy operation is designated on the control panel (i.e. when the auto color copy button is pressed), the control section executes predetermined operational settings for the scanner, and instructs the image processing section to determine whether an original is color or monochromatic, on the basis of RGB image information that is sent from the scanner.

If the original determination result of the image processing section shows that the original is color, the control section instructs the image processing section to convert RGB image information, which is sent from the scanner, to YMCK (yellow, magenta, cyan and black) signals that enable the color printer to produce a color output. In addition, the control section sets a color print mode for 4-color print in the color printer.

On the other hand, if the original determination result of the image processing section shows that the original is monochromatic, the control section instructs the image processing section to convert RGB image information, which is sent from the scanner, to a K (black) signal (luminance information) that enables the color printer to produce an image output only in a monochrome mode. In addition, the control section sets a monochromatic print mode for black single-color print in the color printer.

When a color copy operation is designated on the control panel (i.e. when the full color copy button is pressed), the control section executes predetermined operational settings for the scanner, and instructs the image processing section to convert RGB image information, which is sent from the scanner, to YMCK (yellow, magenta, cyan and black) signals that enable the color printer to produce a color output. In addition, the control section sets a color print mode for 4-color print in the color printer.

When a monochromatic copy operation is designated on the control panel (i.e. when the black button is pressed), the control section executes predetermined operational settings for the scanner, and instructs the image processing section to convert RGB image information, which is sent from the scanner, to a K (black) signal (luminance information) that enables the color printer to produce an image output only in a monochrome mode. In addition, the control section sets a monochromatic print mode for black single-color print in the color printer.

FIG. 21 is a block diagram that shows a part of the system configuration of the color MFP of the present invention.

The operation of this system will be described with reference to a flow chart of FIG. 22.

If the start button is pressed, the copying operation is started (step 1).

In this case, if the auto color copy operation is designated on the control panel (i.e. if the auto color button is pressed) or if none of the mode setting buttons is pressed, it is determined that the auto color copy is designated. If some other mode setting button is pressed, it is determined that the auto color copy is not designated (step 2).

If the auto color copy mode is designated, the control section sets the scanner read mode in the scanner so as to enable the RGB line sensors to read an image, that is, so as to enable first image reading means to read an image (step 3), and executes the color scan operation (step 4). Based on the result of execution of the color scan, it is determined whether the original is a color original or not (step 5).

If the determination result in step 2 indicates the color original, the control section instructs the image processing section to select an image process that can convert RGB image information, which is sent from the scanner, to YMCK (yellow, magenta, cyan and black) signals that enable the color printer to produce a color output, i.e. enables first output image forming means to produce an output (step 17). The control section sets the color print mode for 4-color print in the color printer (step 18). Then, the color copying operation is executed (step 19), and the series of operations are completed (step 20).

If the determination result in step 2 indicates the monochromatic original, the control section sets a scanner read mode in the scanner so as to enable the scanner to read an image at high speed by means of only the K line sensor, that is, to enable second image reading means to read an image (step 10). The control section instructs the image processing section to select a process that can print monochromatic image information (K data: luminance information), which is sent from the scanner, with a single black color in the printer section (step 11). The control section sets a monochromatic print mode in the printer section so as to enable the printer section to print a black image at high speed, that is, to enable second output image forming means to print an image (step 12). Then, the monochromatic copying operation is executed (step 19), and the series of operations are completed (step 20).

If the auto color copy mode is not designated, the control section determines whether the monochromatic copy mode is designated (step 6).

In step 6, if the monochromatic copy mode is designated, the control section sets the scanner read mode in the scanner so as to enable the scanner to read an image at high speed by means of only the K line sensor (step 10). The control section instructs the image processing section to select the process that can print monochromatic image information (K data: luminance information), which is sent from the scanner, with a single black color in the printer section (step 11). The control section sets a monochromatic print mode in the printer section so as to enable the printer section to print a black image at high speed (step 12). Then, the monochromatic copying operation is executed (step 19), and the series of operations are completed (step 20).

If the monochromatic copy mode is not designated in step 6, the control section determines whether the monochromatic color copy mode is designated (step 7).

In step 7, if the monochromatic copy mode is designated, the control section sets the scanner read mode in the scanner so as to enable the scanner to read an image at high speed by means of only the K line sensor (step 13). The control section instructs the image processing section to select the same process as the process for black in order to print monochromatic image information (K data: luminance information), which is sent from the scanner, with any one of YMC colors or with overlay of two colors in the printer section (step 14). The control section sets a monochromatic color print mode in the printer section so as to enable the printer section to print image data, which is sent from the image processing section, with a single color at high speed (step 15). Then, the monochromatic color copy operation is executed (step 19), and the series of operations are completed (step 20).

If the monochromatic color copy mode is not designated in step 7, the control section determines whether the color copy mode is designated (step 8).

In step 8, if the copy mode is designated, the control section sets the scanner read mode in the scanner so as to enable the RGB line sensors to read an image, that is, so as to enable the first image reading means to read an image (step 16). The control section instructs the image processing section to select an image process that can convert RGB image information, which is sent from the scanner, to YMCK (yellow, magenta, cyan and black) signals that enable the color printer to produce a color output (step 17). The control section sets the color print mode for 4-color print in the color printer (step 18). Then, the color copying operation is executed (step 19), and the series of operations are completed (step 20).

If the color copy mode is not designated in step 8, the copy mode is not determined although the copying operation is started. Thus, an error is determined (step 9).

By the above-described structure and control flow, the color MFP according to the present invention can execute the respective operation modes under the optimal conditions.

A description in greater detail will be given with reference to FIGS. 22 and 23.

Figure 23:
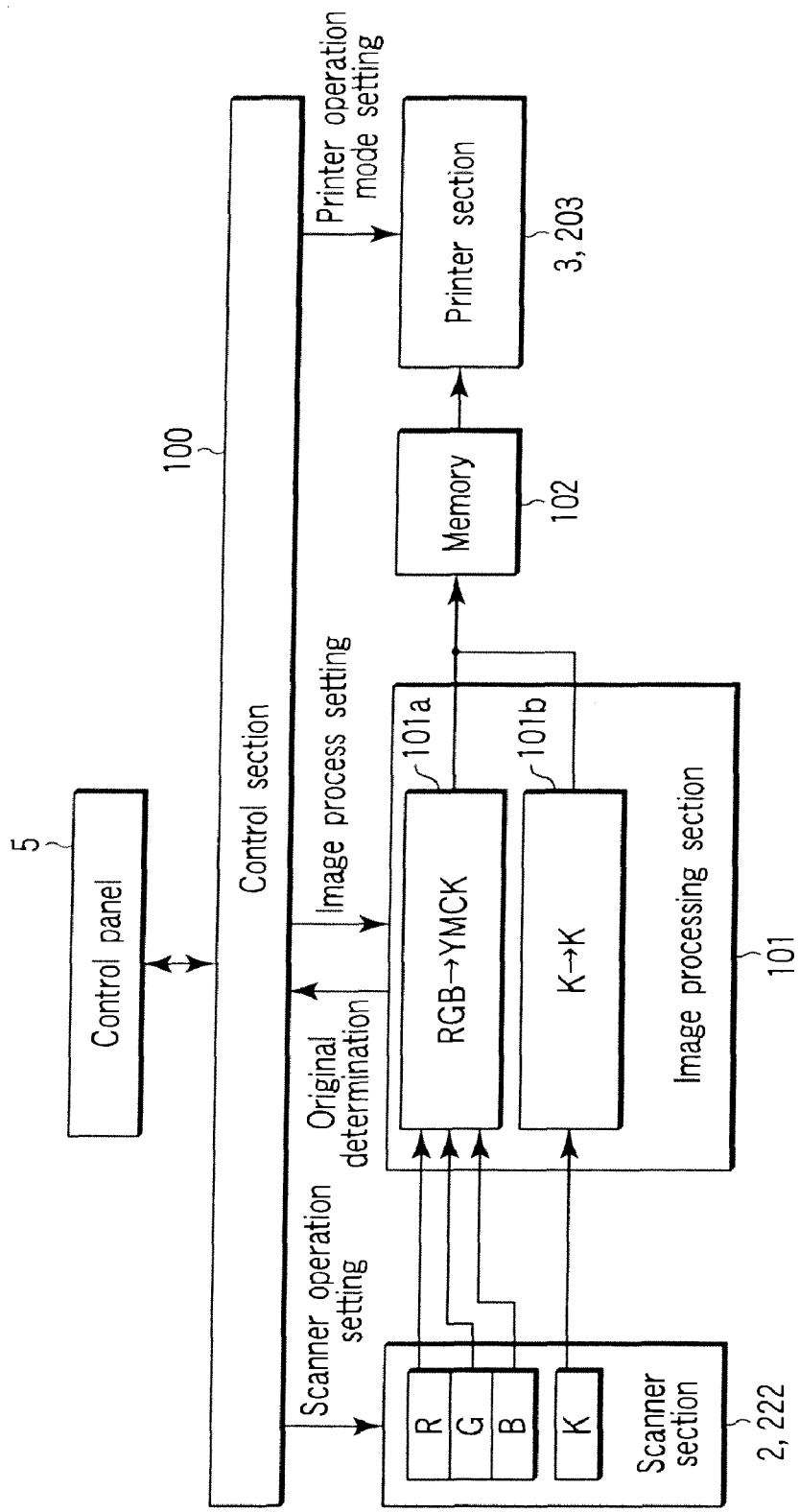
FIG. 23 is a block diagram showing a system configuration of a color MFP according to the present invention.

FIG. 23 shows the system configuration of the color MFP according to the present invention in the image forming apparatus 1 of the first embodiment and the image forming apparatus 201 of the second embodiment. Specifically, the control section 100 is connected to the scanner section 2, 222, the image processing section 101, the memory 102, the printer section 3, 203 serving as the image forming station, and the control panel 5.

Figure 22:
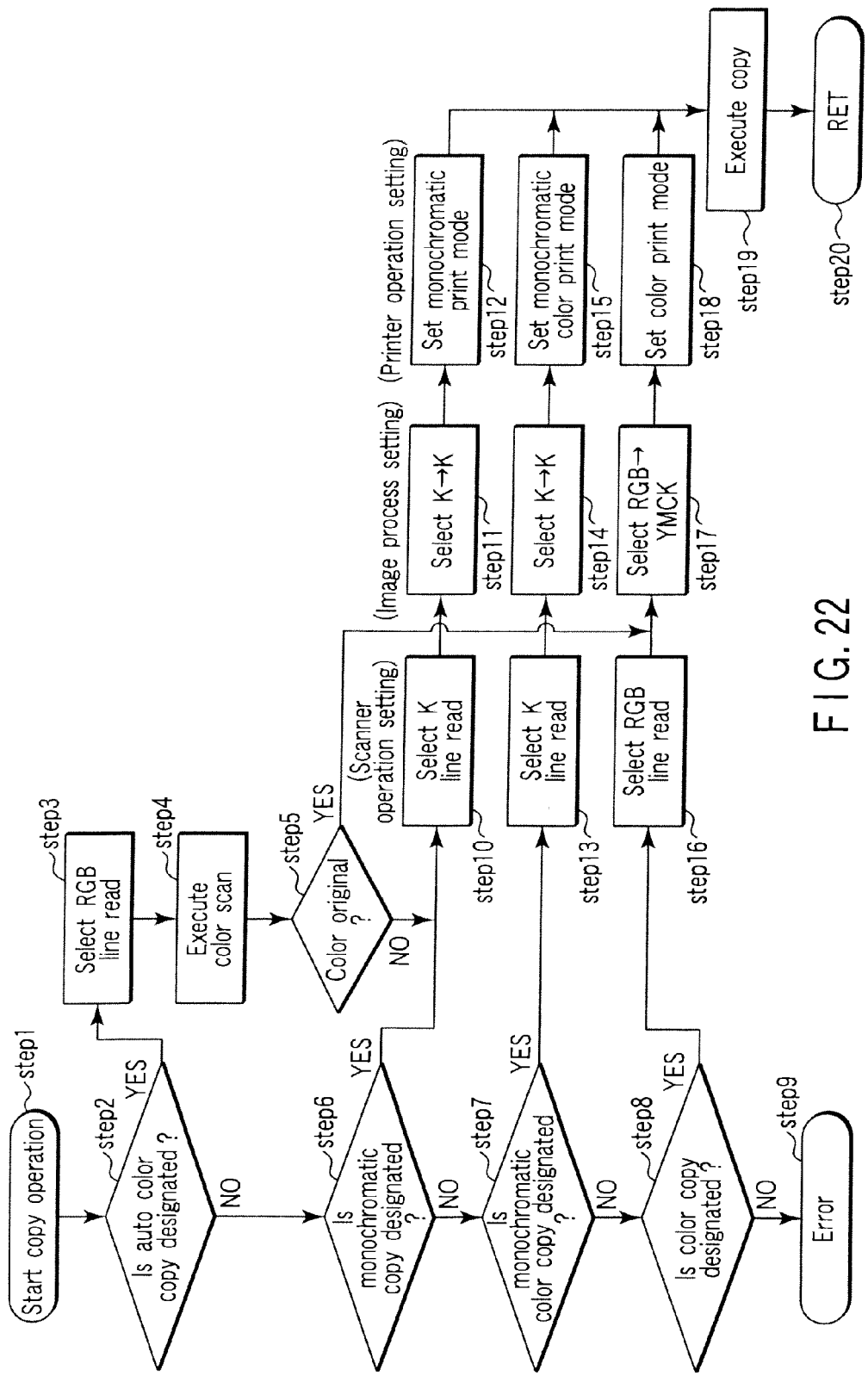
FIG. 22 is a flow chart illustrating the operation of a system of a color MFP.

Next, the operation of the color MFP system configuration is described referring to the flow chart of FIG. 22. The operations of the scanner section 2 and printer section 3 in the image forming apparatus 1 according to the first embodiment and second embodiment will be described later in detail.

If it is detected that the start button 161 is pressed, the control section 100 starts the copying operation (step 1).

In this case, if it is detected that the auto color button 151 is pressed on the control panel 5, the control section 100 determines that the auto color copy is designated (step 2).

If the auto color copy mode is designated, the control section 100 sets the scanner read mode in the scanner section 2 so as to enable the RGB line sensors, which are the first image reading means, to read an image (step 3). The control section 100 executes the color scan operation (step 4).

Based on the result of execution of the color scan in step 4, the control section 100 determines whether the original is a color original or not (step 5). Step 5 corresponds to kind-of-original selection means.

If the determination result in step 5 indicates the color original, the control section 100 sets in the image processing section 101 the image process that can convert RGB image information (read information), which is sent from the scanner section 2, to YMCK (yellow, magenta, cyan and black) signals (color image information) that enable the printer section 3 to produce a color output (step 17). The control section 100 sets the color print mode for 4-color print in the printer section 3 (step 18). The color print mode is a first copy mode.

By setting the first copy mode, the control section 100 executes the copying operation (step 19), and completes the series of operations (step 20). The copy operation at this time is a full color copying operation that is executed by the first output image forming means.

If the determination result in step 5 indicates the monochromatic original, the control section 100 sets the read mode in the scanner section 2 so as to enable the scanner section 2 to read an image at a higher speed than the first image reading means by means of only the K line sensor, that is, to enable the second image reading means to read an image (step 10). The control section 100 sets in the image processing section 101 the image process that can print monochromatic image information (K data: luminance information), which is sent from the scanner 2, with a single black color in the printer section 3 (step 11). The control section 100 sets the monochromatic print mode in the printer section 3 so as to enable the printer section 3 to print a black image (step 12). The monochromatic print is a second copy mode.

By setting the second copy mode, the control section 100 executes the copying operation (step 19), and completes the series of operations are (step 20). The copy operation at this time is a monochromatic copying operation that is executed by the second output image forming means at a higher sprinting speed than the first output image forming means.

If it is determined that the auto color copy mode is not designated in step 2, the control section 100 determines whether the monochromatic copy mode is designated (step 6).

If it is determined in step 6 that the monochromatic copy mode is designated, the control section 100 sets the scanner read mode in the scanner 2 so as to enable the scanner 2 to read an image at a higher speed than the first image reading means by means of only the K line sensor, that is, so as to enable the second reading means to read an image (step 10). The control section 100 sets in the image processing section 101 the image process that can print monochromatic image information (read image), which is sent from the scanner 2, with a single black color in the printer section 3 (step 11). The control section 100 sets the monochromatic print mode in the printer section 3 so as to enable the printer section 3 to print black image data (luminance image information), which is sent from the image processing section 101 (step 12).

The monochromatic print is the second copy mode.

By setting the second copy mode, the control section 100 executes the copying operation (step 19), and completes the series of operations (step 20). The copy operation at this time is the monochromatic copying operation that is executed by the second output image forming means at a higher printing speed than the first output image forming means.

If it is determined in step 6 that the monochromatic copy mode is not designated, the control section 100 determines whether the monochromatic color copy mode is designated (step 7).

In step 7, if the monochromatic copy mode is designated, the control section 100 sets the scanner read mode in the scanner section 2 so as to enable the scanner section 2 to read an image at a higher speed than the first image reading means by means of only the line sensor K, that is, so as to enable the second reading means to read an image (step 13). The control section 100 sets in the image processing section 101 the same image process as the image process for black in order to print monochromatic image information (read image), which is sent from the scanner section 2, with any one of YMC colors or with overlay of two colors in the printer section 3 (step 14). The control section 100 sets the monochromatic color print mode in the printer section 3 so as to enable the printer section 3 to print image data (luminance image information), which is sent from the image processing section 101, with a single color (step 15). The monochromatic color print mode is the second copy mode.

By setting the second copy mode, the control section 100 executes the copying operation (step 19), and completes the series of operations are (step 20). The copy operation at this time is the monochromatic copying operation that is executed by the second output image forming means at a higher sprinting speed than the first output image forming means.

If it is determined in step 7 that the monochromatic color copy mode is not designated, the control section 100 determines whether the color copy mode is designated (step 8).

In step 8, if it is determined that the copy mode is designated, the control section 100 sets the scanner read mode in the scanner section 2 so as to enable the RGB line sensors to read an image, that is, so as to enable the first reading means to read an image (step 16). The control section 100 sets in the image processing section 101 the image process that can convert RGB image information (read image), which is sent from the scanner section 2, to YMCK (yellow, magenta, cyan and black) signals (color image information) that enable the printer section 3 to produce a color output (step 17). The control section 100 sets the color print mode for 4-color print in the printer section 3 (step 18). The color print mode is the first copy mode.

By setting the first copy mode, the control section 100 executes the copying operation (step 19), and completes the series of operations (step 20). The copy operation at this time is the full color copying operation that is executed by the second output image forming means.

If it is determined in step 8 that the color copy mode is not designated, the control section 100 determines an error since the copy mode is not determined although the copying operation is started (step 9).

By the above-described structure and control flow, the image forming apparatus (color MFP) 1, 201 according to the embodiment of the present invention can execute the respective operation modes under the optimal conditions.

Figures 24, 25:
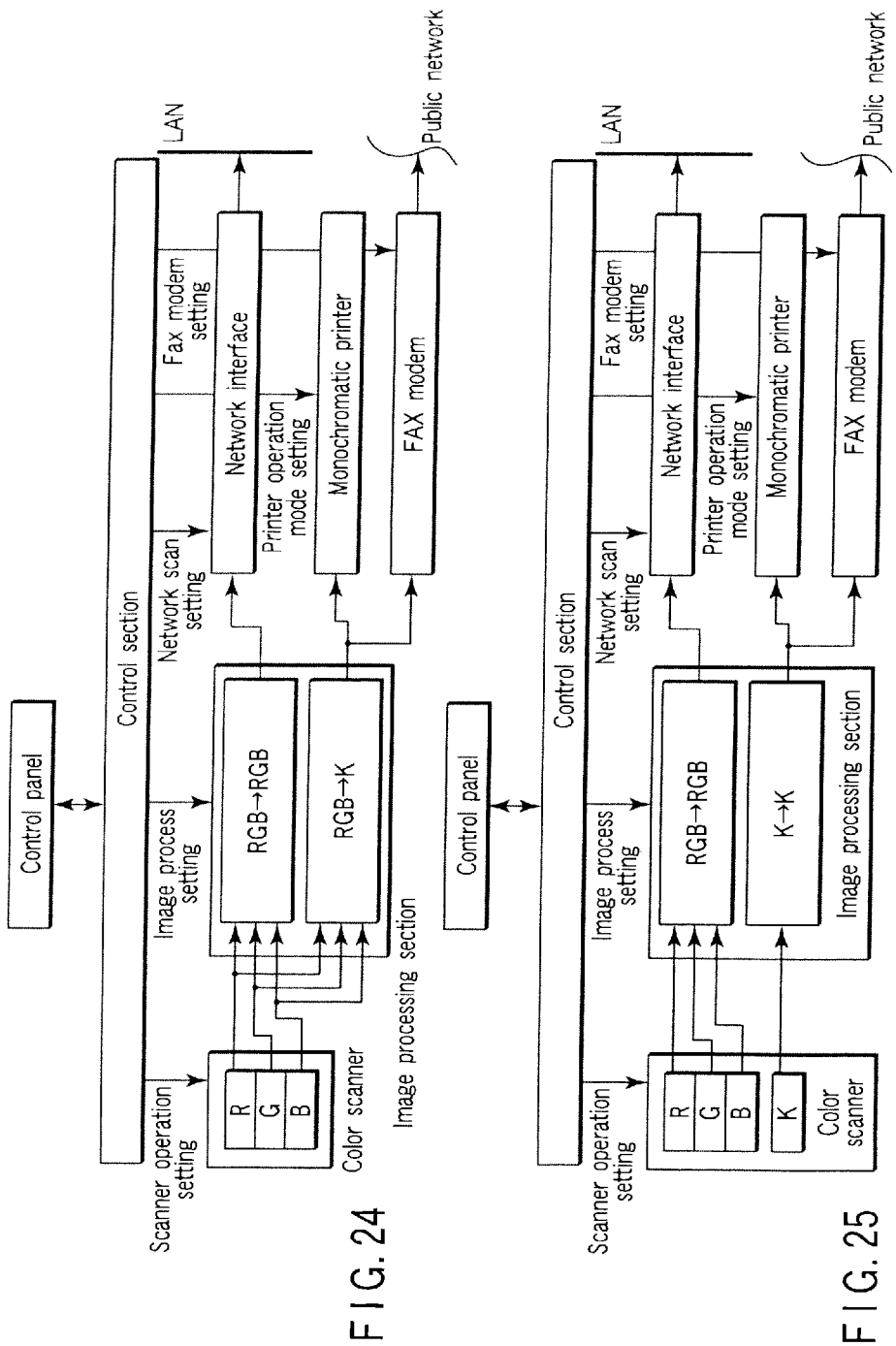
FIG. 24 is a block diagram showing a conventional system of a monochromatic MFP that is capable of executing color scan.
FIG. 25 is a block diagram showing a system, according to the invention, of a monochromatic MFP that is capable of executing color scan.

FIG. 24 is a block diagram that shows a conventional structure of a monochromatic MFP that is capable of executing color scan. As is shown in the Figure, the sensor of the scanner section comprises three lines.

In the case where copy is designated through the control panel, RGB color information that is read by the scanner section is converted to K (monochromatic) data (luminance information) in the image processing section, and the converted data is sent to a monochromatic printer section. The monochromatic printer section prints out the K data (luminance information).

Similarly, in the case where FAX is designated through the control panel, K data (luminance information) that is output from the image processing section is sent to a FAX modem, and the FAX modem outputs the K data to a public network according to a predetermined format.

In the case where the scanner is designated through the control panel, RGB color information that is read by the scanner section is converted to predetermined RGB data in the image processing section, and the converted data is sent to a network interface. The network interface outputs the RGB data to a network (LAN) according to a predetermined format.

Comparing the speeds that are required for the copy operation, FAX operation and scanner operation (output to the network), a highest speed is required for the copy operation. In general, high speed is not required for the FAX operation and network scan. For example, the transmission performance of a high-speed FAX is, at most, about 10 sheets per minute. This is because of the presence of a bottleneck in the communication line. Even if the speed of the scanner is increased, this will not enhance the speed of the system. On the other hand, in the case of the copy operation, the speed of 20 to 30 sheets per minute is common, and machines with the speed of 80 or more sheets per minute are not rare.

In the case where the copy function and the FAX/network scan function are to be realized by using the same scanner (reading device), a scanner with excessively high specifications for the FAX/network scan function is inevitably mounted. Furthermore, in the case where the print engine is a monochromatic one, a high speed is required with respect to monochromatic information (luminance information). In the prior art, however, since monochromatic information (luminance information) is obtained from a color sensor, a high-speed color reading device is unreasonably required.

FIG. 25 is a block diagram showing the system configuration of the monochromatic MFP of the present invention.

The system operation is described with reference to a flow chart of FIG. 26.

If the start button is pressed, the operation is started. In this case, if the copy operation is designated on the control panel (i.e. if the color designation button is pressed) or if none of the mode setting buttons is pressed, the control section determines that the copy operation is designated (step 30). If some other mode setting button is pressed, it is determined that the copy operation is not designated (step 31).

If the copy mode is designated, the control section sets the scanner read mode in the scanner so as to enable the scanner to read an image at high speed by means of the K line sensor (step 35). The control section instructs the image processing section to select the image process that can convert K image information (luminance information), which is sent from the scanner, to K data (luminance information) that can be output from the (monochromatic) printer (step 36). The control section executes the copy operation (step 37), and completes the series of operations (step 44). By this operation, monochromatic copy can be executed at high speed with high image quality.

If the copy operation is not designated in step 31, the control section determines whether the FAX operation mode is designated (step 32).

If the FAX operation mode is designated in step 32, the control section sets in the scanner the scanner read mode so as to enable the K line sensor to read an image (step 38). The control section instructs the image processing section to select the image process that can convert K image information (luminance information), which is sent from the scanner, to a signal that can be output to the public network (step 39). The control section executes predetermined settings in the FAX modem, executes the FAX operation (monochromatic scan) (step 40), and completes the series of operations (step 44).

If the FAX operation is not designated in step 32, the control section determines whether the scanner operation mode is designated (step 33).

If the scanner operation is designated in step 33, the control section sets in the scanner the scanner read mode so as to enable the RGB line sensors to read an image (step 41). The control section instructs the image processing section to select the image process that can convert RGB color image information, which is sent from the scanner, to a signal that can be output to the public network (step 42). The control section executes predetermined settings in the network interface, executes the color scan operation (step 43), and completes the series of operations (step 44).

If it is determined in step 33 that the scanner operation is not designated, the control section determines an error since the operation mode is not determined although the operation is started (step 34).

By the above-described structure and control flow, the monochromatic MFP according to the embodiment of the present invention can execute the respective operation modes under the optimal conditions.

A description in greater detail will be given with reference to FIGS. 26 and 27.

FIG. 27 shows the system configuration of the monochromatic MFP according to the present invention in the image forming apparatus 301 of the third embodiment. Specifically, a control section 300 is connected to a color scanner section 302, an image processing section 321, a monochromatic printer section 303, a network interface 322 that is connected to a LAN 323, and a FAX modem 324 that is connected to the public network.

Figure 26:
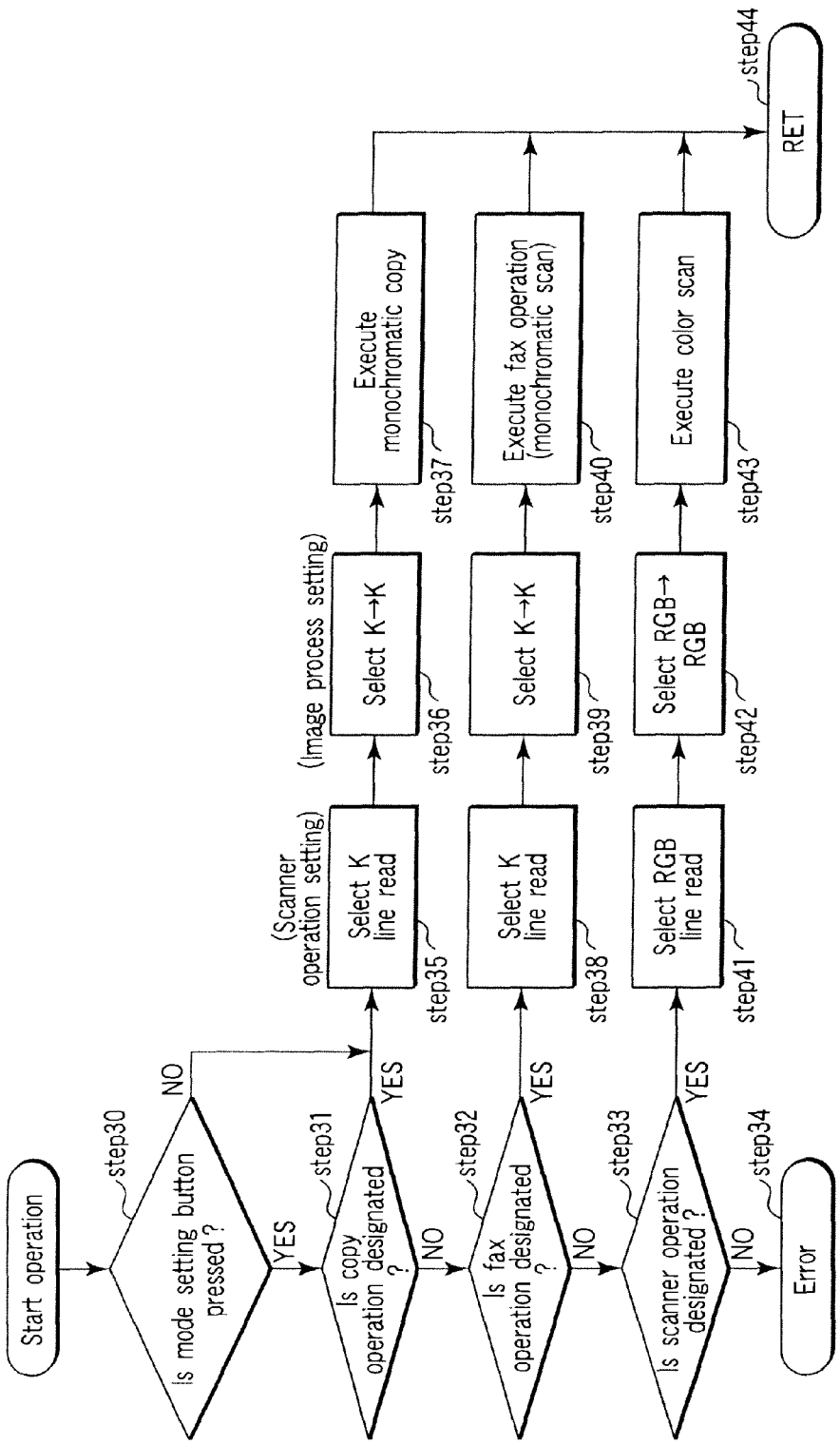
FIG. 26 is a flow chart illustrating the operation of a system of a monochromatic MFP.

Next, the operation of the monochromatic MFP system configuration is described referring to the flow chart of FIG. 26.

If the start button 161 is pressed, the control section 300 starts the operation.

In this case, the control section 300 determines whether the mode setting button is pressed (step 30).

If the copy button 351 is pressed in step 30 (step 31) or if none of the mode setting buttons is pressed, the control section 300 determines that the copy operation is designated.

If the control section 300 determines that the copy operation is designated, the control section 300 sets the scanner read mode in the color scanner section 302 so as to enable the color scanner section 302 to read an image at a higher speed than the RGB line sensors by means of the K line sensor (step 35). The control section 300 sets in the image processing section 321 the image process that can convert K image information (read image), which is sent from the color scanner section 302, to K data (luminance image information) that can be output from the monochromatic printer section 303 (step 36).

The control section 300 executes the copy operation (step 37), and completes the series of operations (step 44). By this operation, monochromatic copy can be executed with high image quality using the line sensor K at a higher reading speed than the RGB line sensors.

If the copy operation is not designated in step 31, the control section 300 determines whether the FAX operation mode is designated (step 32).

If the FAX operation mode is designated in step 32, the control section 300 sets in the color scanner section 302 the scanner read mode so as to enable the line sensor K to read an image (step 38). The control section 300 sets in the image processing section 321 the image process that can convert K image information (luminance information), which is sent from the color scanner section 302, to a signal (image information) that can be output to the public network (step 39).

The control section 300 executes predetermined settings in the FAX modem 324, executes the FAX operation (monochromatic scan) (step 40), and completes the series of operations (step 44).

If the FAX operation is not designated in step 32, the control section 300 determines whether the scanner operation mode is designated (step 33).

If the scanner operation is designated in step 33, the control section 300 sets in the color scanner section 302 the scanner read mode so as to enable the line sensors R, G, B to read an image (step 41). The control section 300 sets in the image processing section 321 the image process that can convert RGB color image information (read image), which is sent from the color scanner section 302, to a signal (color image information) that can be output to the network (step 42).

The control section 300 executes predetermined settings in the network interface 322, executes the color scan operation (step 43), and completes the series of operations (step 44).

If it is determined in step 33 that the scanner operation is not designated, the control section 300 determines an error since the operation mode is not determined although the operation is started (step 34).

By the above-described structure and control flow, the image forming apparatus (monochromatic MFP) 301 according to the embodiment of the present invention can execute the respective operation modes under the optimal conditions.

Next, a different-kinds-of-originals successive copying operation using the 4-rotation-type color printer shown in FIG. 1 is described.

Figure 28:
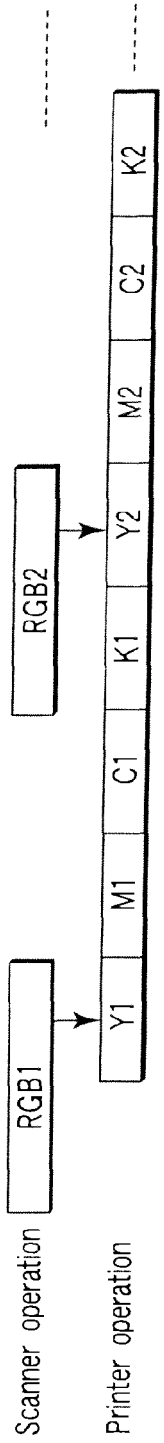
FIG. 28 is a timing chart that illustrates the operations of the scanner section and printer section.
Figure 29:
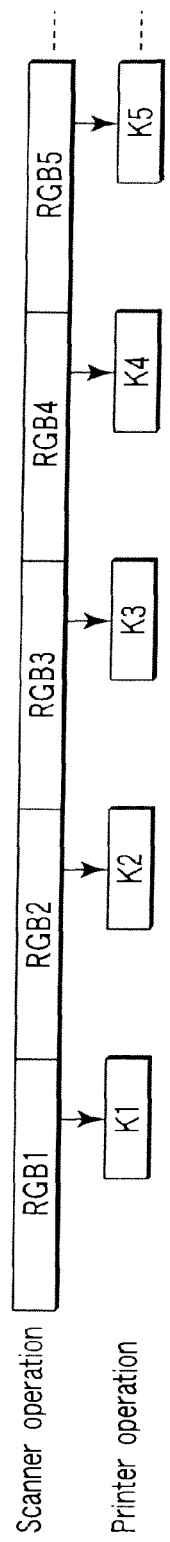
FIG. 29 is a timing chart that illustrates the operations of the scanner section and printer section.
Figure 30:
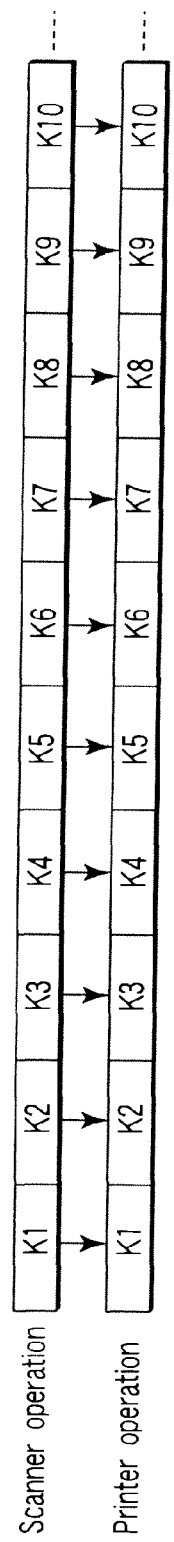
FIG. 30 is a timing chart that illustrates the operations of the scanner section and printer section.

FIGS. 28, 29 and 30 are timing charts illustrating the operations of the scanner and printer. For simple description, it is assumed that the ratio of the time, which is needed for the scanner to read a color image using the RGB lines, to the time, which is needed for the printer to form a single-color image, is 2:1. In addition, it is assumed that the ratio of the time, which is needed for the scanner to read a monochromatic image using the K line, to the time, which is needed for the printer to form a single-color image, is 1:1.

To begin with, the color copying operation is described referring to FIG. 28.

The scanner reads a first original by means of the RGB sensor. In the chart, the image read information of the first original is indicated by RGB1. The image processing section converts the RGB1 signal to YMCK signals that are used in printing. In the chart, the YMCK signals of the first original, which have been converted, are indicated by Y1, M1, C1 and K1, respectively.

The printer cannot stop the operation before it is completed. Thus, the printer starts printing of the first Y1 signal after some time has passed since the beginning of the operation of the scanner. At the earliest, the printer starts printing of the first Y1 signal at a timing when the scanner can complete the reading of the image at a time instant at which the printer finishes the printing of the Y1 signal.

The RGB1 signal of the first original, which is read by the scanner, or the M1, C1 and K1 signals, which are converted by the image processing section, are stored in the memory. The stored signals are used when the M1, C1 and K1 signals are to be printed after the printer finishes the printing of the Y1 signal. By storing the image information in the memory, the scanner may execute only one reading operation for one original.

As is clear from the timing chart, a 4-cycle operation of Y, M, C and K is necessary for the printer to form a color image. Even if the speed of the printing operation for one color is double the speed of the color image reading operation of the scanner, there is some temporal allowance before the reading of the next original has to be started.

In the present embodiment, in order to copy a color image with high efficiency, it is preferable for the scanner to start the reading of a color image on the second original at the latest at a timing when the printer starts printing of the K1 signal. Based on the RGB2 signal of the second original, the printer starts the printing of the Y2 signal.

By repeating the series of these operations, the successive color copy of different kinds of originals is executed.

Next, a conventional monochromatic copying operation is described referring to FIG. 29. In the prior art, as has been described above, the RGB signals that are read by the scanner are converted to a K signal (luminance information) by the image process. Thus, the series of copying operations are executed as follows.

To start with, the scanner reads a first original by means of the RGB sensor. In the timing chart, the image read information of the first original is indicated by RGB1. The image processing section converts the RGB1 signal to a K signal (luminance signal) that is used in monochromatic printing. In the timing chart, the K signal (luminance information) of the first original, which has been converted by the image processing section, is indicated by K1. As in the case of the color copying operation, the printer cannot stop the operation before it is completed. Thus, the printer starts printing of the first K1 signal after some time has passed since the beginning of the operation of the scanner. At the earliest, the printer starts printing of the first K1 signal at a timing when the scanner can complete the reading of the image at a time instant at which the printer finishes the printing of the K1 signal.

As is clear from the timing chart, the printer forms a monochromatic image only in a 1-cycle operation of K. Thus, in this case, there is an allowance in the printer operation. Specifically, even in the state in which the printer completes the printing of the K1 signal of the first original and stands by for printing of the K2 signal of the second original, the speed of the scanner operation is ½ of the speed of the printer operation. Consequently, the next K2 information is yet to be obtained, and successive printing cannot be executed. As is clear from the timing chart, the printing operations are executed intermittently.

This means that the potential printing speed of the printer section cannot be exhibited, and that even if the printer operates for the same time period, the number of copies to be printed out decreases. This leads to such problems that a useless operation time, which does not contribute to the printout, occurs, and the machine life (lifetime) and the life (lifetime) of consumable parts, such as the photoconductor drum, become shorter.

Next, the monochromatic operation in the present invention will now be described referring to FIG. 30.

As has been described above, the ratio of the time, which is needed for the scanner to read a monochromatic image using the K line, to the time, which is needed for the printer to form a single-color image, is 1:1. As is clear from the time chart, no useless time occurs if the scanner operation speed is well balanced with the printer operation speed.

Specifically, the printer starts the printing operation for the K1 signal substantially at the same time as the scanner starts the reading of the image information K1 of the first monochromatic original by means of the K line. The printer section completes the printing of the K1 substantially at the same time as the scanner section completes the reading of the image K1 of the first original. The printer section starts the printing of K2 substantially at the same time as the scanner section starts the reading of the image K2 of the second original by means of the K line. Since the scan operation and print operation progress synchronously with no useless time, the monochromatic copy can efficiently be executed.

The different-kinds-of-originals successive copy operation using the image forming apparatus 1 of the first embodiment shown in FIG. 1 will be described in greater detail. The operation to be described below is controlled by the control section 100.

FIGS. 28 and 30 are timing charts illustrating the operations of the scanner section 2 and printer section 3. For simple description, it is assumed that the ratio of the time, which is needed for the scanner section 2 to read a color image using the line sensors R, G, B, to the time, which is needed for the printer section 3 to form a single-color image, is 2:1. In addition, it is assumed that the ratio of the time, which is needed for the scanner section 2 to read a monochromatic image using the line sensor K, to the time, which is needed for the printer section 3 to form a single-color image, is 1:1.

To begin with, the color copying operation is described referring to FIG. 23 and the timing chart of FIG. 28.

The scanner section 2 reads a first original by means of the line sensors R, G, B. In the timing chart, the image read information of the first original is indicated by RGB1.

The image processing section 101 converts the RGB1 signal to YMCK signals that are used in the printer section 3. In the timing chart, the YMCK signals of the first original, which have been converted by the image processing section 101, are indicated by Y1, M1, C1 and K1, respectively.

The printer section 3 cannot stop the operation before it is completed. Thus, the printer section 3 starts printing of the first Y1 signal after some time has passed since the beginning of the operation of the scanner section 2. At the earliest, the printer section 3 starts printing of the first Y1 signal at a timing when the scanner section 2 can complete the reading of the image of the original at a time instant at which the printer section 3 finishes the printing of the Y1 signal.

The RGB1 signal of the first original, which is read by the scanner section 2, or the M1, C1 and K1 signals, which are converted by the image processing section 101, are stored in the memory 102. The stored signals are used when the M1, C1 and K1 signals are to be printed after the printer section 3 finishes the printing of the Y1 signal. By storing the image information in the memory 102, the scanner section 2 may execute only one reading operation for one original.

As is clear from the timing chart, a 4-cycle operation of Y, M, C and K is necessary for the printer section 3 to form a color image. Even if the speed of the printing operation for one color is double the speed of the color image reading operation of the scanner section 2, there is some temporal allowance before the reading of the next original has to be started.

In the case of the image forming apparatus 1 of the present first embodiment, in order to copy a color image with high efficiency, it is preferable for the scanner section 2 to start the reading of a color image on the second original at the latest at a timing when the printer section 3 starts printing of the K1 signal. Based on the RGB2 signal of the second original, the printer section 3 starts the printing of the Y2 signal.

By repeating the series of these operations, the successive color copy of different kinds of originals is executed.

Next, the monochromatic copying operation of the present invention in the image forming apparatus 1 of the first embodiment is described referring to FIG. 23 and the timing chart of FIG. 29.

As has been described above, the ratio of the time, which is needed for the scanner section 2 to read a monochromatic image using the line sensor K, to the time, which is needed for the printer section 3 to form a single-color image, is 1:1. As is clear from the time chart, no useless time occurs if the scanner operation speed is well balanced with the operation speed of the printer section 203 (the enhancement in efficiency).

Specifically, the printer section 3 starts the printing operation for the K1 signal substantially at the same time as the scanner section 2 starts the reading of the image information K1 of the first monochromatic original by means of the line sensor K. The printer section 3 completes the printing of the K1 substantially at the same time as the scanner section 2 completes the reading of the image K1 of the first original.

In addition, the printer section starts the printing of K2 substantially at the same time as the scanner section 2 starts the reading of the image K2 of the second original by means of the line sensor K. Since the scan operation and print operation progress synchronously with no useless time (standby time), the monochromatic copy can efficiently be executed.

As a result, at the time of monochromatic copy, the copy can be executed with higher efficiency than at the time of color copy.

In short, the speed of monochromatic copy can be increased.

Next, a different-kinds-of-originals successive copying operation using the 4-series tandem type color printer shown in FIG. 14 is described.

FIGS. 31, 32 and 33 are timing charts illustrating the operations of the scanner and printer. For simple description, it is assumed that the ratio of the time, which is needed for the scanner to read a color image using the RGB lines, to the time, which is needed for the printer to form a single-color image, is 1:1.

To begin with, the color copying operation is described referring to FIG. 31.

The scanner reads a first original by means of the RGB sensor. In the timing chart, the image read information of the first original is indicated by RGB1. The image processing section converts the RGB1 signal to YMCK signals that are used in printing. In the timing chart, the YMCK signals of the first original, which have been converted by the image processing section, are indicated by Y1, M1, C1 and K1, respectively.

The printer starts outputting Y1, which is delivered from the image processing section, substantially at the same time as the scanner section starts the reading operation. The outputs of M1, C1 and K1 are executed in parallel in a simultaneous fashion, with a delay corresponding to distances between the respective photoconductor drums of Y, M, C and K.

If the scanner section starts reading the second original, the image processing section starts converting the read information to Y2, M2, C2 and K2 and the printer section starts printing the respective signals.

As is clear from the timing chart, the scanner section and printer section operate synchronously, and no useless time occurs.

Next, the monochromatic copying operation of the conventional structure is described referring to FIG. 32.

As has been described above, when the printer section outputs a monochromatic image, the speed of the operation increases four times. Thus, the time that is needed for the image formation is reduced to ¼.

On the other hand, in the conventional structure, even when a monochromatic image is to be read, the scanner section reads the original by the RGB scheme and the time for capturing the image is unchanged. Thus, as is shown in the timing chart, the printer section starts outputting the monochromatic image K1 after some time has passed since the beginning of the operation of reading the first original. As is clear from the relation in timing, when the copy of the second original is to be executed, the printer section starts to operate and output the black image after some time has passed since the start of the reading of the second original. If the image is output in this manner, the printer section can exhibit only about ¼ of the performance for the black image output.

Next, the monochromatic operation in the present invention will now be described referring to FIG. 33.

In the case of the structure of the present invention, when a black image is to be copied, the scanner section uses the K line shown in FIGS. 12 and 13, thereby enabling the reading of the image at a speed that is four times higher than the speed for color reading. As is shown in the timing chart, the time K1 that is needed for the reading of the monochromatic image is ¼ of the above-mentioned time RGB1 for the reading of the color image. The printer section can start the operation substantially at the same time as the scanner section starts the reading of the image. Similarly, when a second original is to be copied, the printer section can execute image formation substantially at the same time as the scanner section starts the reading of the image. If the image is output in this manner, the black image output performance of the printer section can fully be exhibited, and the performance is enhanced four times.

The different-kinds-of-originals successive copy operation using the image forming apparatus 201 of the second embodiment shown in FIG. 14 will be described in greater detail. The operation to be described below is controlled by the control section 100.

FIGS. 31 and 33 are timing charts illustrating the operations of the scanner section 222 and printer section 203. For simple description, it is assumed that the ratio of the time, which is needed for the scanner section 222 to read a color image using the line sensors R, G, B, to the time, which is needed for the printer section 203 to form a single-color image, is 1:1.

To begin with, the color copying operation is described referring to FIG. 23 and the timing chart of FIG. 31.

The scanner section 222 reads a first original by means of the line sensor, R, G, B. In the timing chart, the image read information of the first original is indicated by RGB1.

The image processing section 101 converts the RGB1 signal to YMCK signals that are used in printing. In the timing chart, the YMCK signals of the first original, which have been converted by the image processing section 101, are indicated by Y1, M1, C1 and K1, respectively.

The printer section 203 starts outputting Y1, which is delivered from the image processing section 101, substantially at the same time as the scanner section 222 starts the reading operation. The outputs of M1, C1 and K1 are executed in a simultaneous, parallel fashion, with a delay corresponding to distances between the respective photoconductor drums of Y, M, C and K (4Y, 4M, 4C, 4K).

If the scanner section 222 starts reading the second original, the image processing section 101 starts converting the read information to Y2, M2, C2 and K2 and the printer section 203 starts printing the respective signals.

As is clear from the timing chart, the scanner section 222 and printer section 203 operate synchronously, and no useless time occurs.

Next, the monochromatic operation of the present invention in the image forming apparatus 201 according to the second embodiment will now be described referring to FIG. 23 and the timing chart of FIG. 33.

In the case of the second embodiment, when a black image is to be copied, the scanner section 222 uses the line sensor BK shown in FIGS. 12 and 13, thereby enabling the reading of the image at a speed that is four times higher than the speed for color reading.

As is shown in the timing chart, the time K1 that is needed for the reading of the monochromatic image is ¼ of the above-mentioned time RGB1 for the reading of the color image. Thus, the printer section 203 can start the operation substantially at the same time as the scanner section 222 starts the reading of the image.

Similarly, when the second original is to be copied, the printer section 203 can execute image formation substantially at the same time as the scanner section 222 starts the reading of the image. If the image is output in this manner, the black image output performance of the printer section 203 can fully be exhibited, and the performance is enhanced four times.

As a result, at the time of black image output, the image output per original can be executed at a higher speed than at the time of color image output.

In short, the speed of monochromatic copy can be increased.

As has been described above, in the embodiment of the invention, the color image reading device includes a 1-line sensor with no color filter for reading a monochromatic image, in addition to the sensor for reading a color image (3-line sensor with RGB color filters).

When monochromatic copy is executed, the 1-line sensor with no color filter reads an image, and a monochromatic image is formed based on the read image information. The 1-line sensor with no color filter reads the image by a single line. Thus, the image can be read with high sharpness, without color misregistration, and the quality of the read image is enhanced. Moreover, since the filter is not provided, the sensitivity is higher than the sensor with a color filter, and high-speed image reading is realized. Accordingly, there is no need to increase the size of the scanner section, or to mount a large-sized light source.

A converter circuit for converting the RGB signals to the monochromatic signal is needless, and an inexpensive circuit configuration is realized.

When a monochromatic image is to be copied by the color MFP, the 1-line sensor with no color filter reads the image at high speed with high sharpness, and the printer section is operated at high speed in a monochromatic image formation mode. Thereby, high-speed, high-image-quality monochromatic copy can be executed. At the time of monochromatic successive copy of different kinds of originals, the monochromatic image reading operation of the scanner is high, and no useless time occurs in the print output. Therefore, the machine lifetime and the lifetime of consumable parts, such as the photoconductor drum, do not become shorter.

In the present embodiments, no optical filter is disposed on the line sensor K of the 4-line CCD sensor. The invention, however, is not limited to the embodiments, and a transparent optical filter member may be provided.

In the embodiments, the printer section is constructed by using the electrophotographic system. The invention, however, is not limited to the embodiments, and an ink-jet system, a thermal printer, or conventional printing means may be adopted.

According to the image forming apparatus of the present invention, the speed of monochromatic copy image formation can be increased.

What is claimed is:

1. An image forming apparatus comprising:
    a first image reader configured to read an image at a first scan speed via a filter, which passes light of a specific wavelength band, and convert the image to image information;
    a second image reader configured to read an image at a second scan speed, which is higher than the first scan speed, and convert the image to image information;
    a plurality of image forming stations that are associated with different colors;
    a first printer configured to print an image on the basis of the image information that is read by the first image reader on a paper, and to form a color image by synchronously operating the plurality of image forming stations;
    a second printer configured to print an image on the basis of the image information that is read by the second reader on a paper, to form a single-color image by operating a predetermined one of the plurality of image forming stations at a higher speed than the first printer, and to form the single-color image by using the image forming station of a black color; and
    a developing unit provided in the image forming station of a black color and that is capable of accommodating an amount of developing agent larger than that accommodated in each of the developing units provided in the image forming station of a color that is different from black.

2. The image forming apparatus according to claim 1, wherein the first image reader converts the read image to color image information,
    the second image reader converts the read image to luminance image information,
    the first printer forms a color image on the basis of the color image information that is obtained by the conversion of the first image reader, and
    the second printer forms a single-color image on the basis of the luminance image information that is obtained by the conversion of the second image reader.

3. The image forming apparatus according to claim 2, wherein the number of colors, which are used in the first printer, is greater than that in the second printer.

4. The image forming apparatus according to claim 1, wherein the second printer forms the single-color image by using the image forming station of a color that is, at least, different from black.

5. The image forming apparatus according to claim 1, wherein the image forming station of a color that is different from black comprises a revolver, the revolver accommodating a plurality of developing units of a color that is different from black.

6. The image forming apparatus according to claim 1, wherein the second image reader converts the read image to luminance image information, and
    the second printer forms a single-color image on the basis of the luminance image information that is obtained by the conversion of the second image reader.

* * * * *